(12) United States Patent
Izawa

(10) Patent No.: US 9,167,224 B2
(45) Date of Patent: Oct. 20, 2015

(54) IMAGE PROCESSING DEVICE, IMAGING DEVICE, AND IMAGE PROCESSING METHOD

(71) Applicant: FUJIFILM Corporation, Tokyo (JP)

(72) Inventor: Katsutoshi Izawa, Saitama (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 14/495,174

(22) Filed: Sep. 24, 2014

(65) Prior Publication Data

US 2015/0009299 A1     Jan. 8, 2015

Related U.S. Application Data

(63) Continuation of application No. PCT/JP2013/059206, filed on Mar. 28, 2013.

(30) Foreign Application Priority Data

Mar. 29, 2012     (JP) .................................. 2012-077175

(51) Int. Cl.
*H04N 15/00*     (2006.01)
*H04N 13/02*     (2006.01)
(Continued)

(52) U.S. Cl.
CPC ............. *H04N 13/0025* (2013.01); *G02B 7/34* (2013.01); *G03B 13/36* (2013.01); *G03B 35/10* (2013.01);
(Continued)

(58) Field of Classification Search
CPC .......... H04N 13/0025; H04N 13/0225; H04N 13/0018; H04N 13/0282
USPC ........................................................... 348/49
See application file for complete search history.

(56) References Cited

U.S. PATENT DOCUMENTS 8,289,379 B2     10/2012   Takahashi et al.
2013/0010078 A1     1/2013   Aoki
(Continued)

FOREIGN PATENT DOCUMENTS

CN     101651842 A     2/2010
JP     2002-191060 A     7/2002
(Continued)

OTHER PUBLICATIONS

International Search Report, mailed May 21, 2013, issued in PCT/JP2013/059206.
(Continued)

*Primary Examiner* — Hee-Yong Kim
(74) *Attorney, Agent, or Firm* — Birch, Stewart, Kolasch & Birch, LLP

(57) ABSTRACT

The present invention includes an image acquisition device configured to acquiring multiple viewpoint images that are generated by pupil-division imaging and that are different in viewpoint, a parallax calculation device 40a for calculating a first parallax amount between viewpoint images for the multiple viewpoint images, a memory 48 in which parallax correction information indicating the relationship between the first parallax amount and the deviation amount in the parallax direction for the corresponding object images, which is a deviation amount between viewpoint images for the multiple viewpoint images and is caused by the pupil-division imaging, is stored, and a parallax correction device 40b for calculating a second parallax amount, which is an amount resulting from correcting the first parallax amount to the deviation amount in the parallax direction for the object images, based on the first parallax amount and the parallax correction information stored in the memory 48.

15 Claims, 20 Drawing Sheets

(51) Int. Cl.
*H04N 13/00* (2006.01)
*G02B 7/34* (2006.01)
*G03B 13/36* (2006.01)
*G03B 35/10* (2006.01)

(52) U.S. Cl.
CPC ....... *H04N 13/0018* (2013.01); *H04N 13/0022* (2013.01); *H04N 13/0217* (2013.01); *H04N 13/0225* (2013.01); *H04N 13/0282* (2013.01); *H04N 2013/0081* (2013.01)

(56) References Cited

U.S. PATENT DOCUMENTS

| 2013/0010086 A1 | 1/2013 | Iwasaki | |
|---|---|---|---|
| 2013/0107017 A1* | 5/2013 | Endo | 348/49 |
| 2013/0135449 A1 | 5/2013 | Horii | |
| 2013/0278730 A1 | 10/2013 | Hasegawa et al. | |
| 2015/0015672 A1* | 1/2015 | Iwasaki | 348/46 |

FOREIGN PATENT DOCUMENTS

| JP | 2011-515045 A | 5/2011 |
|---|---|---|
| WO | WO 2009/110958 A2 | 9/2009 |
| WO | WO 2011/118077 A1 | 9/2011 |
| WO | WO 2011/118089 A1 | 9/2011 |
| WO | WO 2012/002307 A1 | 1/2012 |
| WO | WO 2012/036019 A1 | 3/2012 |

OTHER PUBLICATIONS

Written Opinion of the International Searching Authority, mailed May 21, 2013, issued in PCT/JP2013/059206.

Chinese Office Action dated May 5, 2015 issued in Chinese Patent Application No. 201380018241.2, with English language translation.

Chinese Search Report dated May 5, 2015 issued in Chinese Patent Application No. 201380018241.2, with English language translation.

* cited by examiner 71L 71R 72L 72R

FIG.17
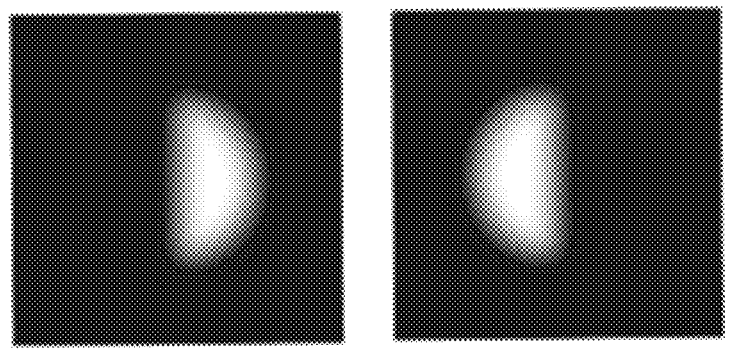
LEFT AND RIGHT BLURRED SHAPES AT CENTER OF SCREEN
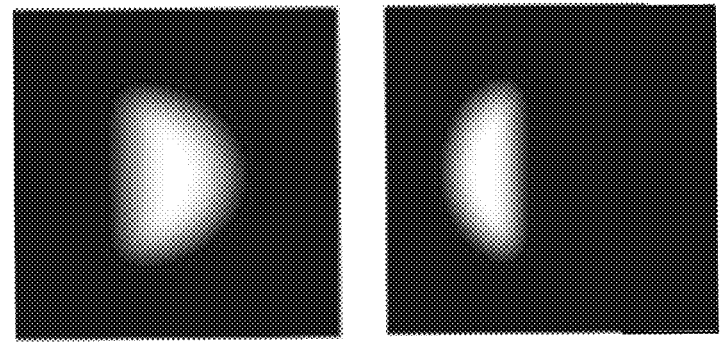
LEFT AND RIGHT BLURRED SHAPES AT LEFT EDGE OF SCREEN

IMAGE PROCESSING DEVICE, IMAGING DEVICE, AND IMAGE PROCESSING METHOD

CROSS-REFERENCE TO RELATED APPLICATIONS

This application is a Continuation of PCT International Application No. PCT/JP2013/059206 filed on Mar. 28, 2013, which claims priority under 35 U.S.C. §119(a) to Japanese Patent Application No. 2012-77175 filed on Mar. 29, 2012. Each of the above application(s) is hereby expressly incorporated by reference, in its entirety, into the present application.

BACKGROUND OF THE INVENTION

1. Field of the Invention

The present invention relates to an image processing device, an imaging device and an image processing method, and particularly relates to an image processing device, an imaging device and an image processing method that make it possible to obtain a parallax resistant to noise and equivalent to a parallax to be perceived by humans, in the case of detecting a parallax for multiple viewpoint images that are imaged by pupil division.

2. Description of the Related Art

A stereoscopic imaging device including an imaging element that performs imaging by a pupil-division scheme is known. In the case of using such an imaging element with a pupil-division scheme, as a method for calculating a parallax by performing matching between left and right images, a method in which the positional deviation amount between blocks to minimize the sum of squares of the pixel value differences is regarded as a right solution and is output is well known. Thus, typically, the calculation of the parallax is performed using a method (correlation method) in which the parallax is calculated by the correlation based on the pixel values of the left-eye image and right-eye image.

For example, PTL 1 (Japanese Patent Application Laid-Open No. 2002-191060) discloses a phase difference type image sensor that includes a micro-lens whose upper part is opened and a micro-lens whose lower part is opened, and thereby, makes it possible to obtain a left-eye image and a right-eye image. Further, it is disclosed to perform the matching between the left-eye image and the right-eye image by a correlation method and determine the distance information.

Further, PTL 2 (National Publication of International Patent Application No. 2011-515045) discloses a phase difference type image sensor that disposes photoelectric conversion elements at the left side and the right side for one cylindrical micro-lens, and thereby, makes it possible to obtain a left-eye image and a right-eye image.

Further, PTL 3 (WO 2011/118089) discloses that a pupil-division imaging is performed so that multiple viewpoint images (a first image and a second image) are acquired, and when different image processes are respectively performed for the multiple viewpoint images, the image processes are performed such that the image quality difference between the multiple viewpoint images after the image processes is reduced.

Further, PTL 4 (WO 2011/118077) discloses that a pupil-division imaging is performed so that multiple viewpoint images (a first parallax image and a second parallax image) are acquired, a restoration filter corresponding to the defocus amount and image height for each position in the multiple viewpoint images is selected for each position, and the deconvolution is performed for each position in the multiple viewpoint images based on the selected restoration filter, so that the multiple viewpoint images are restored.

SUMMARY OF THE INVENTION

However, when imaging is performed by an imaging element with a pupil-division scheme, the left-eye image and the right-eye image are not a set of images in which the object images with the same form are simply deviated from each other in the left-right direction, but in practice, are a set of images that resemble images filtered by left-right symmetric semilunar filters respectively, due to the imaging optical system. Therefore, there is a problem in that, when the block matching between such left-eye image and right-eye image is performed, a slightly different parallax from a parallax to be perceived by humans is calculated.

Suppose that a method in which a block matching is performed and the positional deviation amount to minimize the sum of squares of the pixel value differences is regarded as a right solution and is output (one kind of the so-called correlation methods) is used, as the calculation method of the parallax. In contrast to this, it seems that humans perceive the deviation amount between the peak positions of signals of the left and right images, as the parallax. That is, when the parallax is calculated by the correlation method, the deviation amount between the peak positions is not always output as the right solution, resulting in a possibility that there is a slight difference from the parallax to be perceived by humans.

Further, although it is possible to calculate the deviation amount between the peak positions as the parallax, the comparison between the peak positions is generally weak against noise, and the probability that the parallax cannot be detected is high. In contrast to this, the parallax calculation by the correlation method is resistant to noise.

PTLs 1 and 2 disclose only the phase difference type image sensors, and do not disclose that a parallax resistant to noise and equivalent to a parallax to be perceived by humans is obtained. Further, PTL 3 discloses that the image processes are performed such that the image quality difference between the viewpoint images is reduced, and do not disclose that a parallax resistant to noise and equivalent to a parallax to be perceived by humans is obtained. Further, PTL 4 discloses the restoration process of performing the deconvolution for each position in the multiple viewpoint images, and do not disclose that a parallax resistant to noise and equivalent to a parallax to be perceived by humans is obtained. That is, in the technologies described in PTLs 1 to 4, it is difficult to obtain a parallax equivalent to a parallax to be perceived by humans.

The present invention has been made in view of such a circumstance, and has an object to provide an image processing device, an imaging device and an image processing method that make it possible to obtain a parallax resistant to noise and equivalent to a parallax to be perceived by humans, in the case of detecting a parallax for multiple viewpoint images that are generated by pupil-division imaging and that are different in viewpoint.

For achieving the above object, the present invention provides an image processing device including: an image acquisition device configured to acquiring multiple viewpoint images generated by pupil-division imaging, the multiple viewpoint images being different in viewpoint; a first parallax amount calculation device configured to calculating a first parallax amount between viewpoint images for the multiple viewpoint images; a storage device in which parallax correction information is stored, the parallax correction information indicating a relationship between the first parallax amount and a deviation amount in a parallax direction for corresponding object images, the deviation amount being a deviation amount between viewpoint images for the multiple viewpoint images and being caused by the pupil-division imaging; and a second parallax amount calculation device configured to calculating a second parallax amount based on the first parallax amount and the parallax correction information stored in the storage device, the second parallax amount being an amount resulting from correcting the first parallax amount to the deviation amount in the parallax direction for the object images.

Here, the "parallax direction" is a direction in the viewpoint images that corresponds to the direction of connection of an eye and an eye in both eyes. For example, when a pupil-division imaging is performed using an imaging element that has a phase-difference pixel, the direction of the phase difference of the phase-difference pixel is the "parallax direction". That is, the direction of connection between corresponding points that correspond between multiple viewpoint images is the "parallax direction".

According to the present invention, the first parallax amount as a temporary right solution of the parallax amount between the viewpoint images is calculated by the first parallax amount calculation device, and the first parallax amount as the temporary right solution is corrected to the deviation amount in the parallax direction between the viewpoint images for real object images, based on the first parallax amount and the parallax correction information stored in the storage device. Therefore, it is possible to obtain a parallax resistant to noise and equivalent to a parallax to be perceived by humans. Here, the "parallax to be perceived by humans" is the "deviation amount in the parallax direction for the real object images".

In an embodiment, the deviation amount in the parallax direction for the object images is a deviation amount of peak positions of pixel values of the object images between viewpoint images for the multiple viewpoint images, and the second parallax amount calculation device calculates the second parallax amount that is an amount resulting from correcting the first parallax amount to the deviation amount of the peak positions of the pixel values of the object images.

In an embodiment, the first parallax amount calculation device calculates the first parallax amount by correlation.

In the embodiment, the relationship between the parallax to be calculated from the matching by correlation and the deviation amount in the parallax direction for the real object images (the deviation amount of the peak positions) is stored in advance, an arbitrary subject is imaged by pupil division, and the generated multiple viewpoint images are acquired. Then, a temporary right solution of the parallax amount between the viewpoint images (the first parallax amount) is determined from the matching by correlation, and the temporary right solution is corrected to the deviation amount in the parallax direction for the real object images (the second parallax amount), based on the temporary right solution and the parallax correction information. Therefore, it is possible to obtain a parallax resistant to noise and equivalent to a parallax to be perceived by humans.

In an embodiment, the multiple viewpoint images are imaged by pupil division, with an imaging element having an imaging surface on which multiple photoelectric conversion elements are arranged, the storage device stores the parallax correction information for each of different positions on the imaging surface of the imaging element, and the second parallax amount calculation device acquires the parallax correction information for each of the positions on the imaging surface of the imaging element, from the storage device, and calculates the second parallax amount based on the acquired parallax correction information, the positions on the imaging surface of the imaging element corresponding to positions in the multiple viewpoint images.

In an embodiment, the storage device stores the parallax correction information for each of color channels of pixels of the viewpoint images, and the second parallax amount calculation device acquires the parallax correction information for each of the color channels that is stored in the storage device, and calculates the second parallax amount for each of the color channels, based on the acquired parallax correction information.

In an embodiment, the multiple viewpoint images are configured by multiple colors of pixels that include a green pixel, the storage device stores the parallax correction information corresponding to the green pixel, and the second parallax amount calculation device calculates the second parallax amount for the green pixel and pixels other than the green pixel of the multiple viewpoint images, based on the parallax correction information corresponding to the green pixel that is stored in the storage device.

In an embodiment, the multiple viewpoint images are imaged using an image-taking optical system whose diaphragm value is variable, the storage device stores the parallax correction information for each of diaphragm values of the image-taking optical system, and the second parallax amount calculation device acquires the parallax correction information with the diaphragm value as a parameter when the multiple viewpoint images are imaged using the image-taking optical system, and calculates the second parallax amount based on the acquired parallax correction information.

An embodiment includes a parallax enhancement device configured to increasing the second parallax amount for the multiple viewpoint images calculated by the second parallax amount calculation device.

An embodiment includes a multi-viewpoint image generation device configured to generating multi-viewpoint images based on the second parallax amount calculated by the second parallax amount calculation device, the multi-viewpoint images being different in the number of viewpoints from the multiple viewpoint images acquired by the image acquisition device.

In an embodiment, the first parallax amount calculation device calculates an evaluation value in a unit of predetermined pixels or sub-pixels by performing a block matching between the viewpoint images, and, as the first parallax amount, sets a deviation amount between positions that minimize the evaluation value, the evaluation value indicating degree of coincidence.

In an embodiment, the parallax calculation device calculates the evaluation value by determining a sum of squares of pixel value differences between the viewpoint images or a sum total of pixel value differences between the viewpoint images.

The storage device stores the parallax correction information as a look-up table or a calculation formula.

Further, the present invention provides an imaging device including the above image processing device and an imaging device configured to performing imaging by a pupil-division scheme.

In an embodiment, the imaging device has an image-taking optical system that includes a focus lens, and the imaging device comprises an autofocus processing device configured to performing a control to adjust a position of the focus lens of the image-taking optical system, based on the second parallax amount calculated by the second parallax amount calculation device.

Further, the present invention provides an image processing method including: a step for acquiring multiple viewpoint images generated by pupil-division imaging, the multiple viewpoint images being different in viewpoint; a step for calculating a first parallax amount between viewpoint images for the multiple viewpoint images; and a step for calculating a second parallax amount based on the first parallax amount and parallax correction information stored in a storage device, the parallax correction information indicating a relationship between the first parallax amount and a deviation amount in a parallax direction for corresponding object images and being stored in the storage device in advance, the deviation amount being a deviation amount between viewpoint images for the multiple viewpoint images and being caused by the pupil-division imaging, the second parallax amount being an amount resulting from correcting the first parallax amount to the deviation amount in the parallax direction for the object images.

The present invention makes it possible to obtain a parallax resistant to noise and equivalent to a parallax to be perceived by humans, in the case of detecting a parallax for multiple viewpoint images that are generated by pupil-division imaging and that are different in viewpoint.

BRIEF DESCRIPTION OF THE DRAWINGS

FIG. 17 is an explanatory diagram that is used for the explanation of the relationship among a position in a screen, the calculated parallax and the deviation amount of peak positions, and that shows left-eye images and right-eye images obtained by the pupil-division imaging of the point light source.

DETAILED DESCRIPTION OF THE PREFERRED EMBODIMENTS

Hereinafter, embodiments of an image processing device, an image processing method, a stereoscopic imaging device and a portable electronic apparatus according to the present invention are explained with reference to the accompanying drawings.

[Overall Configuration of Stereoscopic Imaging Device]

Figure 1:
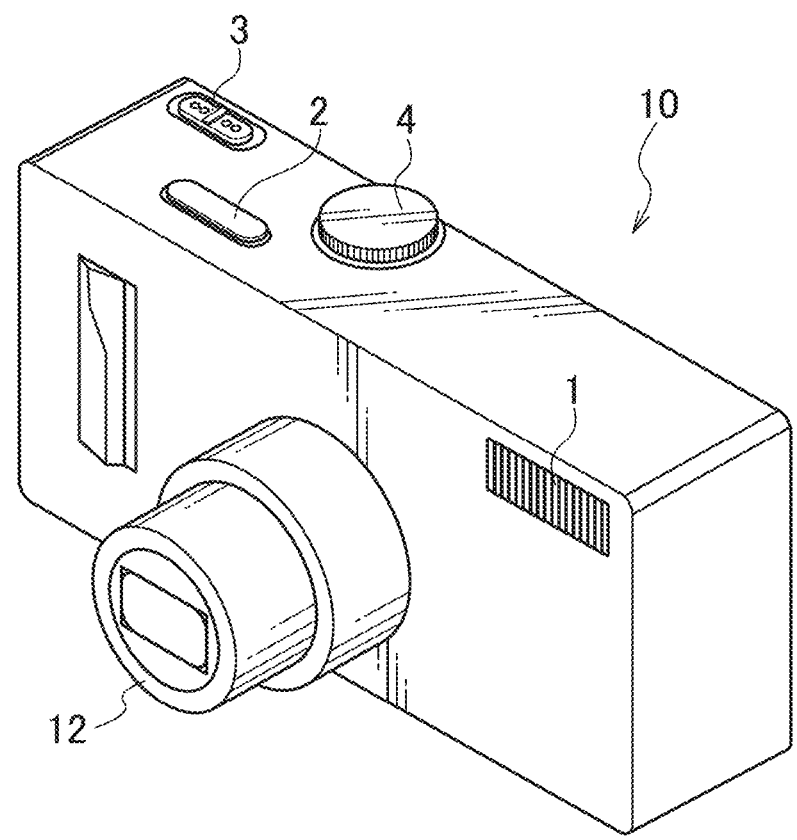
FIG. 1 is a perspective view showing an embodiment of a stereoscopic imaging device to which an image processing device according to the present invention is applied.
Figure 2:
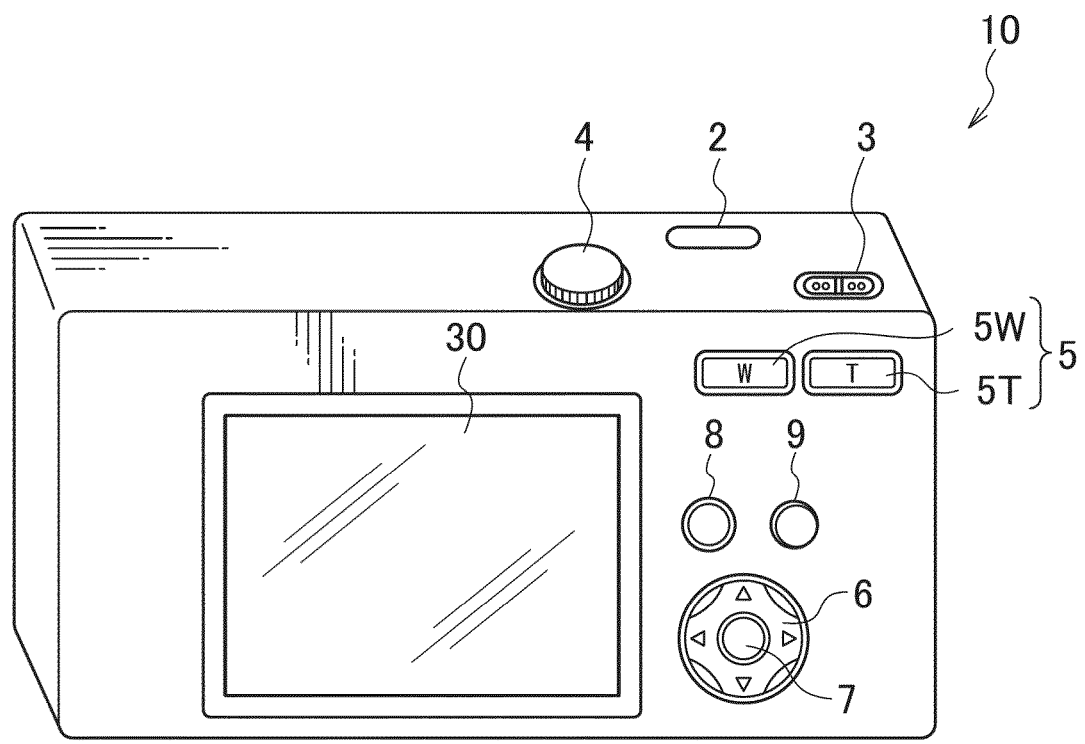
FIG. 2 is a back view of the above stereoscopic imaging device.

FIG. 1 is a perspective view showing an embodiment of a stereoscopic imaging device to which an image processing device according to the present invention is applied. FIG. 2 is a back view of the above stereoscopic imaging device. This stereoscopic imaging device 10 (3D digital camera) is a digital camera that receives the light having passed through a lens with an imaging element, converts it into a digital signal, and then records it in a recording medium such as a memory card.

As shown in FIG. 1, in the stereoscopic imaging device 10, an image-taking lens 12, a strobe 1 and the like are provided on the front surface, and a shutter button 2, a power/mode switch 3, a mode dial 4 and the like are provided on the top surface. On the other hand, as shown in FIG. 2, a 3D liquid crystal monitor 30 for 3D display, a zoom button 5, a cross button 6, a MENU/OK button 7, a playback button 8, a BACK button 9 and the like are provided on the back surface of the camera.

The image-taking lens 12, which is constituted by a collapsible zoom lens, extends from the camera body, when the mode of the camera is set to an image-taking mode by the power/mode switch 3. The strobe 1 emits strobe light toward a main subject.

The shutter button 2 is configured as a two-step stroke type switch that allows for a so-called "half-push" and "full-push". When the stereoscopic imaging device 10 is driven as the image-taking mode, the AE/AF is activated by performing the "half-push" of the shutter button 2, and an image taking is executed by performing the "full-push". Further, when the stereoscopic imaging device 10 is driven as the image-taking mode, an image taking is executed by performing the "full-push" of the shutter button 2.

The power/mode switch 3 has both of a function as a power switch for performing the ON/OFF of the power of the stereoscopic imaging device 10 and a function as a mode switch for setting the mode of the stereoscopic imaging device 10, and is provided so as to be able to slide among an "OFF position", a "playback position" and an "image-taking position". In the stereoscopic imaging device 10, when the power/mode switch 3 is slid and placed to the "playback position" or the "image-taking position", the power is turned on, and when it is placed to the "OFF position", the power is turned off. Then, when the power/mode switch 3 is slid and placed to the "playback position", the "playback mode" is set, and when it is placed to the "image-taking position", the "image-taking mode" is set.

The mode dial 4 functions as an image-taking mode setting device configured to setting the image-taking mode of the stereoscopic imaging device 10, and, depending on the setting position of this mode dial, the image-taking mode of the stereoscopic imaging device 10 is set to various modes. For example, there are a "plane image taking mode" for taking a plane image, a "stereoscopic image taking mode" for taking a stereoscopic image (3D image), a "moving image taking mode" for taking a moving image, and the like.

The 3D liquid crystal monitor 30 is a stereoscopic display device that can display a stereoscopic image (a left-eye image and a right-eye image) with a parallax barrier, as oriented images having predetermined orientations respectively. When a stereovision image is input to the 3D liquid crystal monitor 30, a parallax barrier having a pattern in which light transmitting parts and light blocking parts are alternately arrayed at a predetermined pitch is generated on a parallax barrier display layer of the 3D liquid crystal monitor 30, and strip-shaped image fragments showing the left and right pictures are alternately arranged and displayed on an image display surface of the lower layer. In the case of being utilized as a display panel for a plane image or a user interface, nothing is displayed on the parallax barrier display layer, and a single piece of image is displayed with no change on the image display surface of the lower layer. Here, the form of the 3D liquid crystal monitor 30 is not limited to this, and if displaying a left-eye image and a right-eye image such that they can be recognized as a stereoscopic image, it is allowable to be a form in which a lenticular lens is used, or a form in which the left-eye image and the right-eye image can be individually viewed by putting dedicated glasses such as polarization glasses or liquid-crystal shutter glasses.

The zoom button 5 functions as a zoom instruction device configured to giving an instruction of the zoom, and includes a tele-button 5T for giving an instruction of the telescopic-side zoom and a wide-button 5W for giving an instruction of the wide-side zoom. In the stereoscopic imaging device 10, when the tele-button 5T and the wide-button 5W are operated in the image-taking mode, the focal length of the image-taking lens 12 is changed. Further, when the tele-button 5T and the wide-button 5W are operated in the playback mode, the playing image is magnified or demagnified.

The cross button 6 is an operation unit for inputting instructions for four directions: the upward direction, the downward direction, the leftward direction and the rightward direction, and functions as a button (cursor-movement operation device) for selecting an item from a menu screen, or for giving instructions of selections of various setting items from each menu. The left/right key functions as a frame advance (forward directional/backward directional advance) button in the playback mode.

The MENU/OK button 7 is an operation key having both of a function as a menu button for commanding the display of a menu on the screen of the 3D liquid crystal monitor 30 and a function as an OK button for commanding the decision and execution of the selected content, or the like.

The playback button 8 is a button for the switching to the playback mode, in which a still image or moving image of a taken and recorded stereoscopic image (3D image) or plane image (2D image) is displayed on the 3D liquid crystal monitor 30.

The BACK button 9 functions as a button for giving an instruction of the cancel of an input operation or the restoration to the last operation state.

[Configuration Example of Image-Taking Optical System and Imaging Element]

The image-taking lens 12 is an image-taking optical system that is constituted by many lenses including a focus lens and the zoom lens. In the image-taking mode, the image light showing a subject forms an image on the light receiving surface of the imaging element 16 through the image-taking lens 12.

Figure 3:
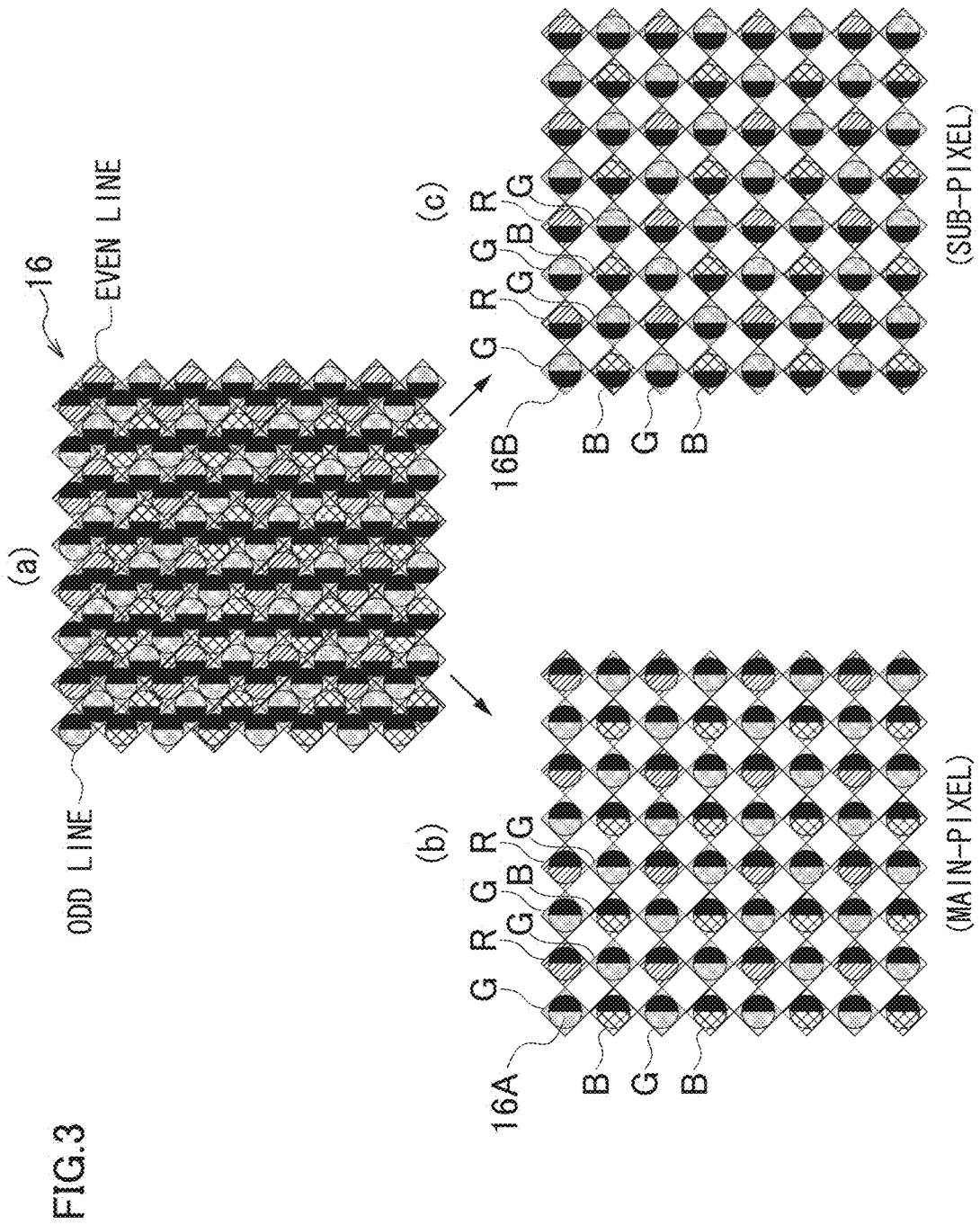
FIG. 3 is a diagram showing a configuration example of an imaging element of the stereoscopic imaging device.

FIG. 3 is a diagram showing a configuration example of the imaging element 16.

The imaging element 16 is configured as a CCD image sensor for detection of images (multiple viewpoint images) having a parallax, and has pixels on odd lines (main-pixels, called A-plane pixels, also) and pixels on even lines (sub-pixels, called B-plane pixels, also), each of which are arranged in a matrix. Two-plane image signals (multiple viewpoint images), into which the main-pixels and sub-pixels are photoelectrically converted respectively, can be independently read.

As shown in FIG. 3, on the odd lines (1, 3, 5, . . . ) of the imaging element 16, of pixels including color filters of R (red), G (green) and B (blue), a line of a pixel arrangement of GRGR . . . and a line of a pixel arrangement of BGBG . . . are alternately provided. On the other hand, as for the pixels on the even lines (2, 4, 6, . . . ), similarly to the odd lines, a line of a pixel arrangement of GRGR . . . and a line of a pixel arrangement of BGBG . . . are alternately provided, and the respective pixels are disposed so as to be deviated in the line direction by one-half pitch relative to the pixels on the even lines.

Figure 4:
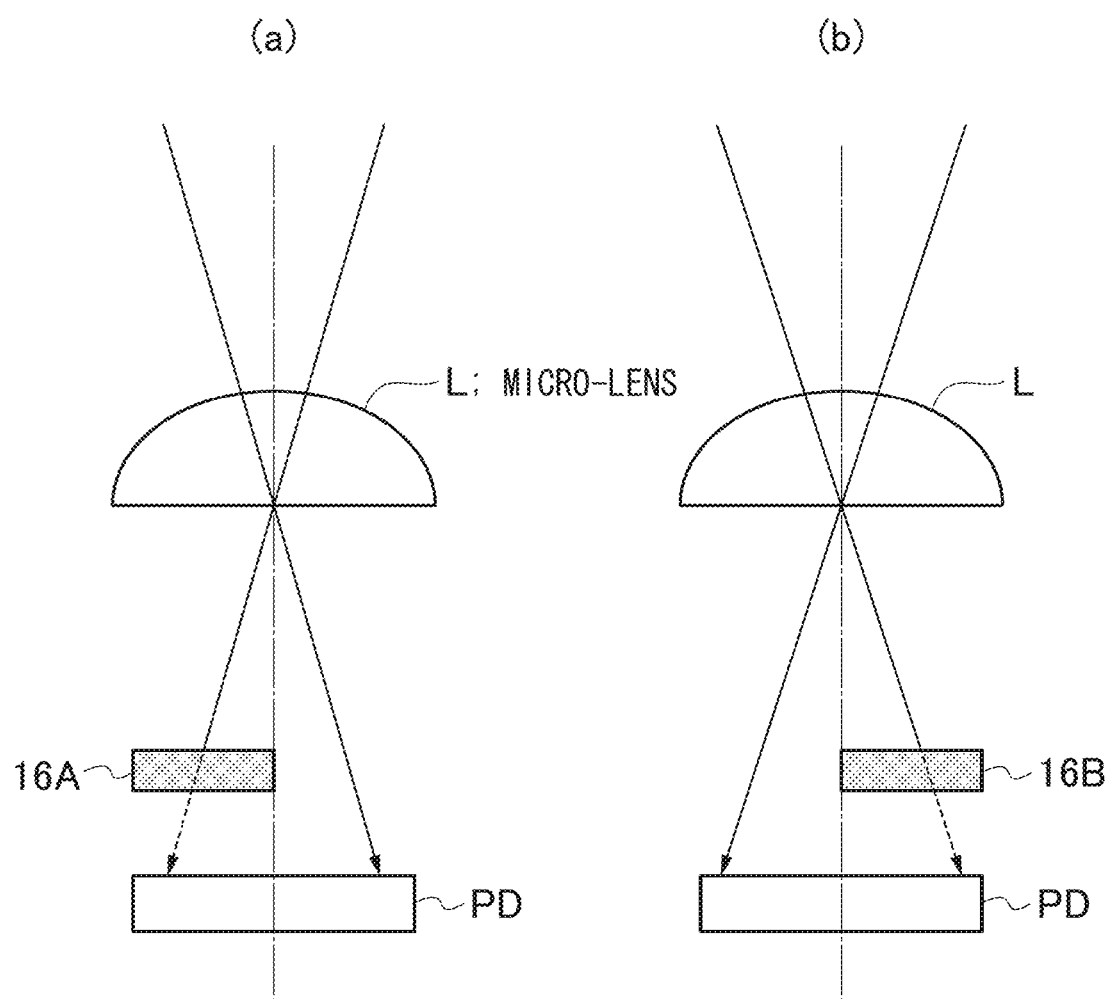
FIG. 4 is an enlarged view of the principal part of the above imaging element.

FIG. 4 is an enlarged view of the principal part of the imaging element 16, which functions as a phase difference image sensor.

As shown in FIG. 4(a), a light blocking member 16A is provided at the front surface side (micro-lens L side) to a photodiode PD of the main-pixel of the imaging element 16. On the other hand, as shown in FIG. 4(b), a light blocking member 16B is provided at the front surface side to a photodiode PD of the sub-pixel. The micro-lenses L and the light blocking members 16A, 16B have a function as a pupil-division device, and as shown in FIG. 4(a), the light blocking member 16A performs the light blocking for the left half of the light receiving surface of the main-pixel (photodiode PD). Therefore, the main-pixel receives only the left side to the optical axis of the light flux passing through the exit pupil of the image-taking lens 12. Further, as shown in FIG. 4(b), the light blocking member 16B performs the light blocking for the right half of the light receiving surface of the sub-pixel (photodiode PD). Therefore, the sub-pixel receives only the right side to the optical axis of the light flux passing through the exit pupil of the image-taking lens 12. Thus, by the microlenses L and the light-blocking members 16A, 16B as the pupil-division device, the light flux passing through the exit pupil is divided into left and right, and they enter the main-pixel and the sub-pixel, respectively.

Further, in a subject image corresponding to the left-half light flux of the light flux passing through the exit pupil of the image-taking lens 12 and a subject image corresponding to the right-half light flux, the focus parts are image-formed at the same position on the imaging element 16, but front-focus or rear-focus parts enter different positions on the imaging element 16 from each other (the phases are deviated). Thereby, the subject image corresponding to the left-half light flux and the subject image corresponding to the right-half light flux can be acquired as parallax images (a left-eye image and a right-eye image) that are different in parallax. Here, the imaging element 16 according to the embodiment is a CCD image sensor, but is not limited to this, and may be a CMOS type image sensor.

[Internal Configuration of Stereoscopic Imaging Device]

Figure 5:
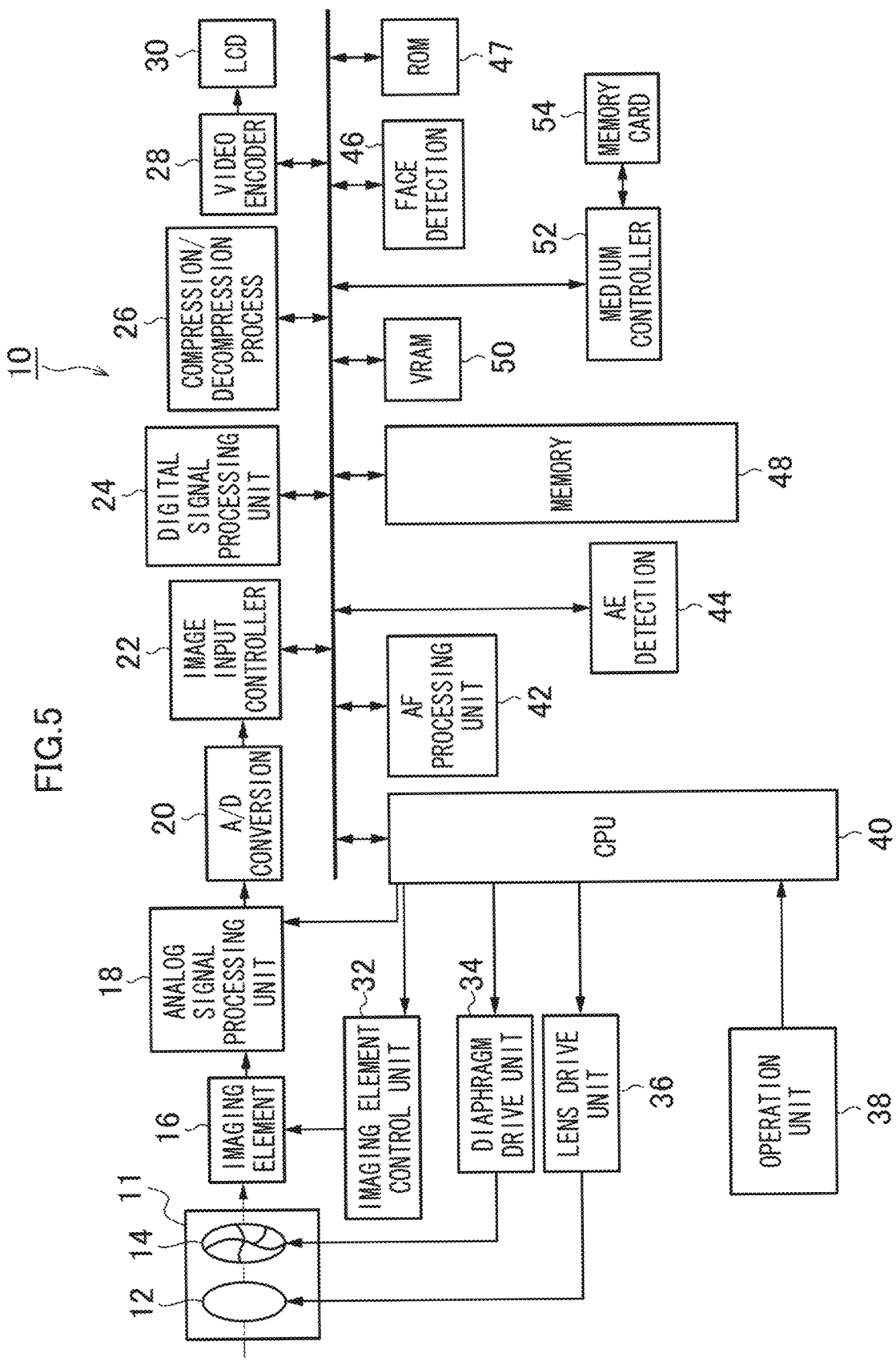
FIG. 5 is a block diagram showing an embodiment of the internal configuration of the above stereoscopic imaging device.

FIG. 5 is a block diagram showing an embodiment of the internal configuration of the above stereoscopic imaging device 10. The stereoscopic imaging device 10 records a taken image in a memory card 54, and the operation of the whole device is integrally controlled by a central processing unit (CPU) 40.

The stereoscopic imaging device 10 is provided with an operation unit 38 such as the shutter button, the mode dial, the playback button, the MENU/OK key, the cross key, the zoom button and the BACK key. A signal from the operation unit 38 is input to the CPU 40. Based on the input signal, the CPU 40 controls each circuit of the stereoscopic imaging device 10, and performs for example, the lens drive control, the diaphragm drive control, the image-taking operation control, the image processing control, the recording/playing control of image data, the display control of the 3D liquid crystal monitor 30, and the like. The operation unit 38 is provided with a parallax-amount setting unit by which a user sets the parallax correction.

When the power of the stereoscopic imaging device 10 is turned on by the power/mode switch 3, a power unit, which is not shown in the figure, supplies electricity to each block, and the drive of the stereoscopic imaging device 10 starts.

The image-taking lens 12 is an imaging optical system that is constituted by many lenses. A diaphragm 14 includes, for example, five diaphragm blades, and a diaphragm drive unit 34 performs the diaphragm control of the diaphragm value (F-value) in a continuous or stepwise manner, for example, from F2 to F8. The light flux passing through the image-taking lens 12, the diaphragm 14 and the like forms an image on the imaging element 16, and signal charges are accumulated in the imaging element 16. The signal charges accumulated in the imaging element 16 are read as a voltage signal corresponding to the signal charges, based on a reading signal to be given from an imaging element control unit 32. The voltage signal read from the imaging element 16 is given to an analog signal processing unit 18.

The analog signal processing unit 18 performs, to the voltage signal output from the imaging element 16, a correlated double sampling process (a process for obtaining accurate pixel data by acquiring the difference between the level of feed through components and the level of pixel signal components contained in the output signal for each pixel of the imaging element 16, with the aim of reducing noises (particularly, thermal noises) and the like contained in the output signal of the imaging element 16). Thereby, the R, G and B signals for each pixel are sampled and held, and, after amplification, are given to an A/D converter 20. The A/D converter 20 sequentially converts the input R, G and B signals into R, G and B digital signals, and outputs them to an image input controller 22.

To the digital image signals input through the image input controller 22, a digital signal processing unit 24 performs predetermined signal processes such as an offset process, a white balance correction, a gain control process including a sensitivity correction, a gamma correction process, a synchronization process, a YC process and an edge enhancement process.

Here, the main-image data read from the main-pixels on the odd lines of the imaging element 16 are processed as left-eye image data, and the sub-image data read from the sub-pixels on the even lines are processed as right-eye image data.

The left-eye image data and right-eye image data (3D image data) processed by the digital signal processing unit 24 are input to a VRAM 50. The VRAM 50 includes an A region and a B region for recording the 3D image data each of which shows a 3D image for one frame. In the VRAM 50, the 3D image data showing a 3D image for one frame are rewritten alternately in the A region and the B region. The written 3D image data are read from the region other than a region in which 3D image data are being rewritten, of the A region and B region in the VRAM 50.

The 3D image data read from the VRAM 50 are encoded in a video encoder 28, and then, are output to the 3D liquid crystal monitor 30 provided on the back surface of the camera. Thereby, 3D subject images are continuously displayed on the display screen of the 3D liquid crystal monitor 30.

When the first-step push (half-push) of the shutter button 2 of the operation unit 38 is performed, the CPU 40 starts the AF operation and the AE operation, moves the focus lens in the optical axis direction through the lens drive unit 36, and performs such a control that the focus lens comes to the focusing position.

The AF processing unit 42 is a part for performing a contrast AF process or a phase-difference AF process. In the case of performing the contrast AF process, for at least one image of the left-eye image and the right-eye image, high frequency components of the image in a predetermined focus region are extracted, and an AF evaluation value indicating a focusing state is calculated by integrating the high frequency components. The focus lens in the image-taking lens 12 is controlled such that the AF evaluation value is maximized, and thereby, the AF control is performed. Further, in the case of performing the phase-difference AF process, the phase difference of images corresponding to the main-pixels and sub-pixels in predetermined focus regions of the left-eye image and right-eye image is detected, and a defocus amount is determined based on the information indicating the phase difference. The focus lens in the image-taking lens 12 is controlled such that the defocus amount is zero, and thereby, the AF control is performed.

In response to the zoom command from the zoom button 5, the CPU 40 advances or retreats the zoom lens in the optical axis direction through the lens drive unit 36, and changes the focal length.

Further, at the time of the half-push of the shutter button 2, the image data output from the A/D converter 20 are taken in an AE detection unit 44.

The AE detection unit 44 integrates the G signals in the whole screen, or integrates the G signals that are weighted differently between the central part and edge part of the screen, and outputs the integrated value to the CPU 40. The CPU 40 calculates the brightness (image-taking Ev value) of the subject, from the integrated value input by the AE detection unit 44, and based on the image-taking Ev value, determines the F-value of the diaphragm 14 and the electronic shutter (shutter speed) of the imaging element 16, in accordance with a predetermined program chart.

Here, in FIG. 5, a constituent to which reference numeral 46 is assigned is a known face detection circuit for detecting the face of a person in an image-taking angular field and setting an area containing the face as an AF area and an AE area (see Japanese Patent Application Laid-Open No. 9-101579, for example).

Further, a constituent to which reference numeral 47 is assigned is a ROM (EEPROM) in which an image processing program for correcting the stereoscopic effect (correcting the parallax) of the left-eye image and right-eye image according to the present invention, a calculation formula or look-up table for calculating a filter coefficient, parameters of a calculation formula corresponding to the degrees of parallaxes or parallax enhancements, or the information for determining a look-up table is stored in addition to a camera control program, the defect information of the imaging element 16, and various parameters or tables to be used for image processes and the like. Here, the detail of the image processing program according to the present invention and the like is described later.

When the AE operation and AF operation by the half-push of the shutter button 2 is finished and the second-step push (full-push) of the shutter button is performed, in response to the push, two pieces of image data of a left viewpoint image (main-image) and a right viewpoint image (sub-image) that correspond to the main-pixels and the sub-pixels and that are output from the A/D converter 20 are input from the image input controller 22 to a memory (SDRAM) 48, and are temporarily stored.

The two pieces of image data temporarily stored in the memory 48 are appropriately read by the digital signal processing unit 24, and here, predetermined signal processes including the synchronization process (a process of performing the interpolation for spatial deviations of color signals associated with the arrangement of primary color filters and converting color signals into a synchronous system), image processes of the parallax correction and edge enhancement according to the present invention, and a YC process (a generation process of luminance data and color difference data of the image data) are performed. The image data (YC data) after the YC process are stored in the memory 48, again.

The two pieces of YC data stored in the memory 48 are each output to a compression/decompression processing unit 26, and, after the execution of a predetermined compression process such as JPEG (joint photographic experts group), are stored in the memory 48, again. From the two pieces of YC data (compressed data) stored in the memory 48, a multi-picture file (MP file: a file in a format in which multiple images are linked) is generated. The MP file is read by a medium controller 52, and is stored in a memory card 54.

Here, the stereoscopic imaging device 10 can acquire not only a stereoscopic image (3D image) but also a plane image (2D image).

[Principal of Parallax Correction]

Next, the principal of the parallax correction in an image processing method according to the present invention is explained.

Figure 6:
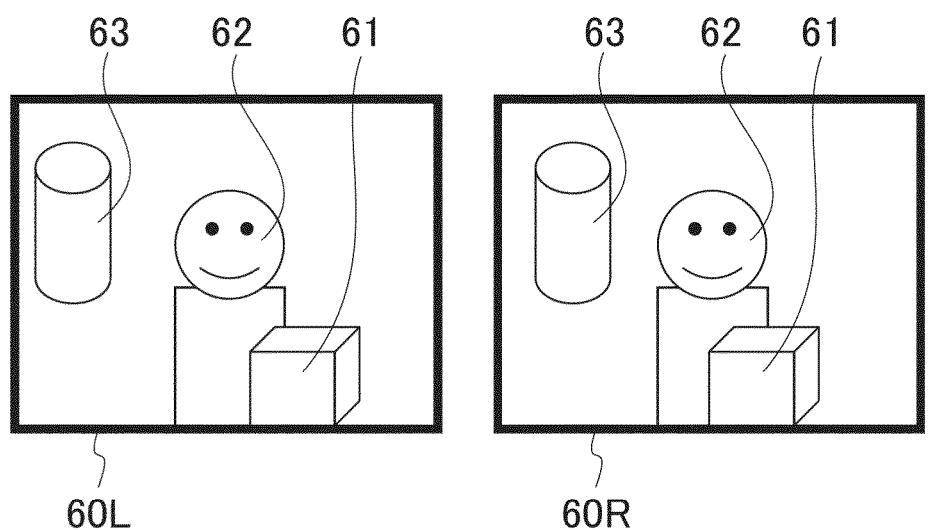
FIG. 6 is an explanatory diagram showing an example of a left-eye image and right-eye image that are imaged by pupil division, with the above imaging element.

FIG. 6 is an example of a left-eye image 60L and a right-eye image 60R that are generated by the pupil-division imaging with the imaging element 16 and that are different in viewpoint. Reference numeral 61 designates short-distance object images, reference numeral 62 designates middle-distance object images, and reference numeral 63 designates long-distance object images. The deviation amount in the parallax direction (the left-right direction in the figure) for the object images with the same reference numeral between the left-eye image 60L and the right-eye image 60R (the deviation amount in the parallax direction between the object images with reference numeral 61, the deviation amount in the parallax direction between the object images with reference numeral 62 and the deviation amount in the parallax direction between the object images with reference numeral 63) corresponds to the real parallax.

The basic flow is [1] parallax measurement and [2] parallax correction, described below.

[1] parallax measurement: between multiple viewpoint images acquired (the left-eye image 60L and right-eye image 60R that are generated by the pupil-division-scheme imaging and that are different in viewpoint), a block matching is performed by a correlation operation, and a parallax (referred to as a "parallax amount", also) is calculated.

[2] parallax correction: based on the calculated parallax for the multiple viewpoint images (the left-eye image 60L and the right-eye image 60R) and the parallax correction information corresponding to the calculated parallax, the calculated parallax is corrected to the deviation amount (real parallax) in the parallax direction for the actual object images.

As the method of the parallax measurement, the correlation method is known. For example, by scanning a kernel having 15 pixels in the x direction and 1 pixel in the y direction and finding a spot in which the sum of the squares of the differences between the pixel values is minimized, the matching can be performed. The measurement result of the parallax can be represented by a monochrome image (range image) in which the more distant a subject is, the brighter it is, and in which the closer a subject is, the darker it is. The parallax measurement in a unit of sub-pixels is also possible, and the detailed method is described in "Optimization of Correlation Function and Sub-Pixel Estimation Method on Block Matching (the Special Interest Group Technical Reports of Information Processing Society of Japan, volume: 2004, number: 40 (CVIM-144), page: 33-40)" by Arai, et al., and the like.

Generally, in the parallax measurement, there is a problem in that the value of a parallax to be calculated by performing the block matching and using a correlation is slightly different from the value of a parallax to be perceived by humans.

This problem is explained using FIG. 7 to FIG. 12.

Figure 7:
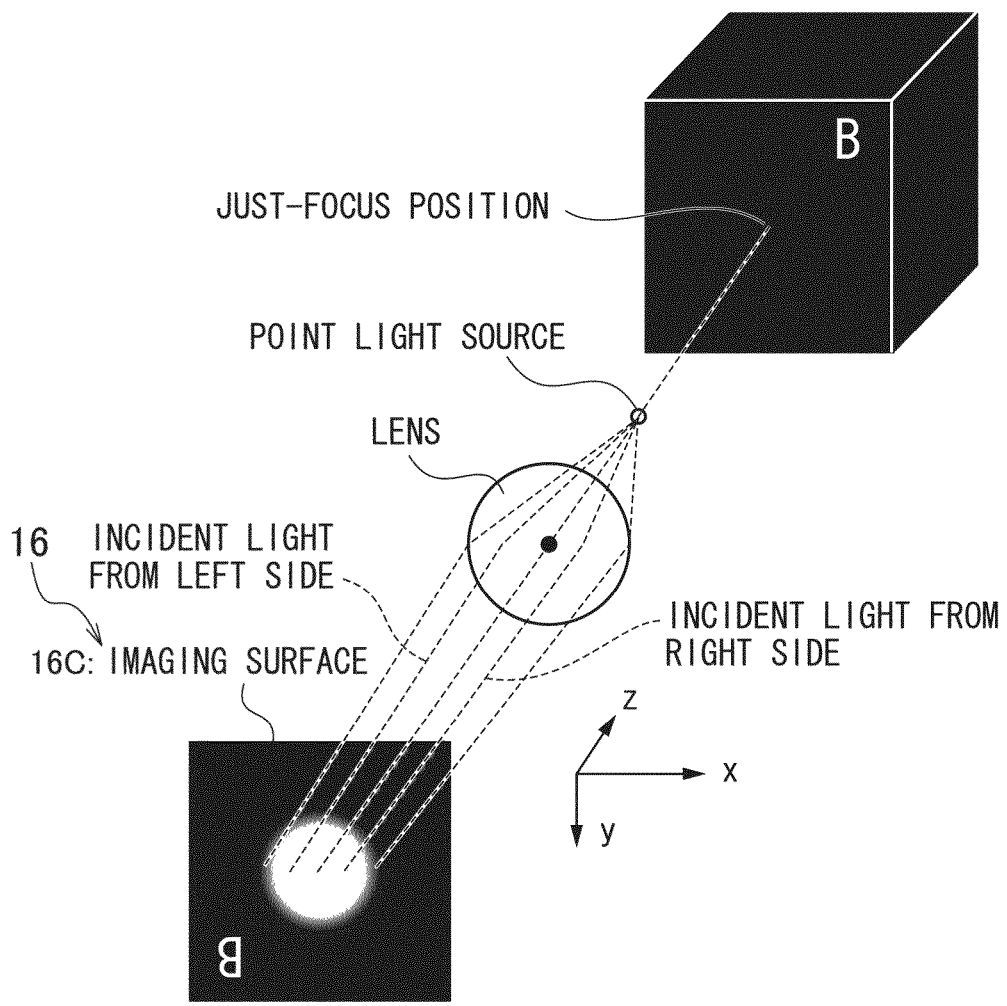
FIG. 7 is an explanatory diagram showing a manner in which a point light source present at a closer position than a just-focus position is imaged by pupil division.

As shown in FIG. 7, when a point light source present at a closer position than the just-focus position is imaged by the pupil-division scheme with the imaging element 16, a blurred circular light image of the point light source is given on the imaging surface 16C of the imaging element 16.

Figure 8:
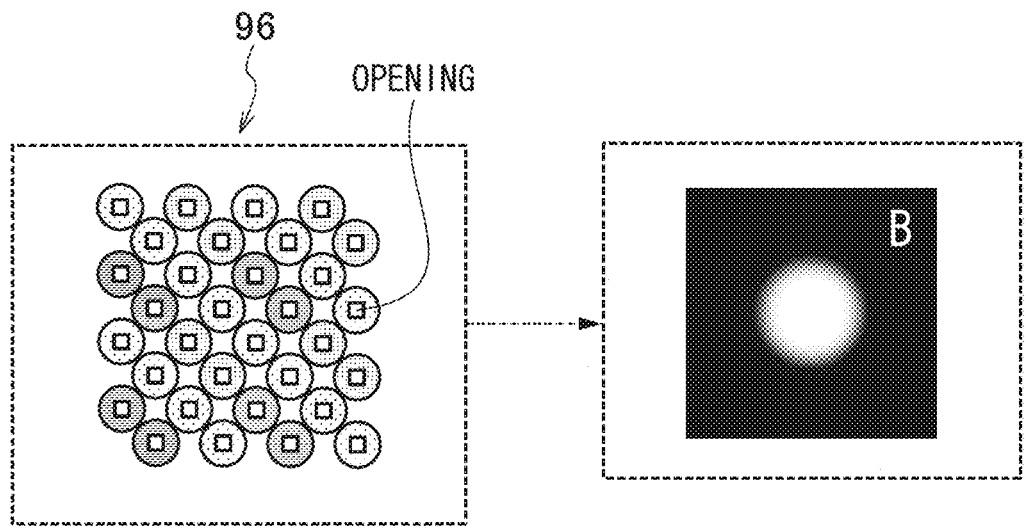
FIG. 8 is an explanatory diagram of a case where a point light source is imaged by ordinary imaging, with a conventional imaging element.

As shown in FIG. 8, if the point light source is imaged by ordinary imaging (imaging by a non-pupil-division scheme) with a conventional imaging element 96, a blurred circular image of the point light source is presented as given on the imaging surface.

Figure 9:
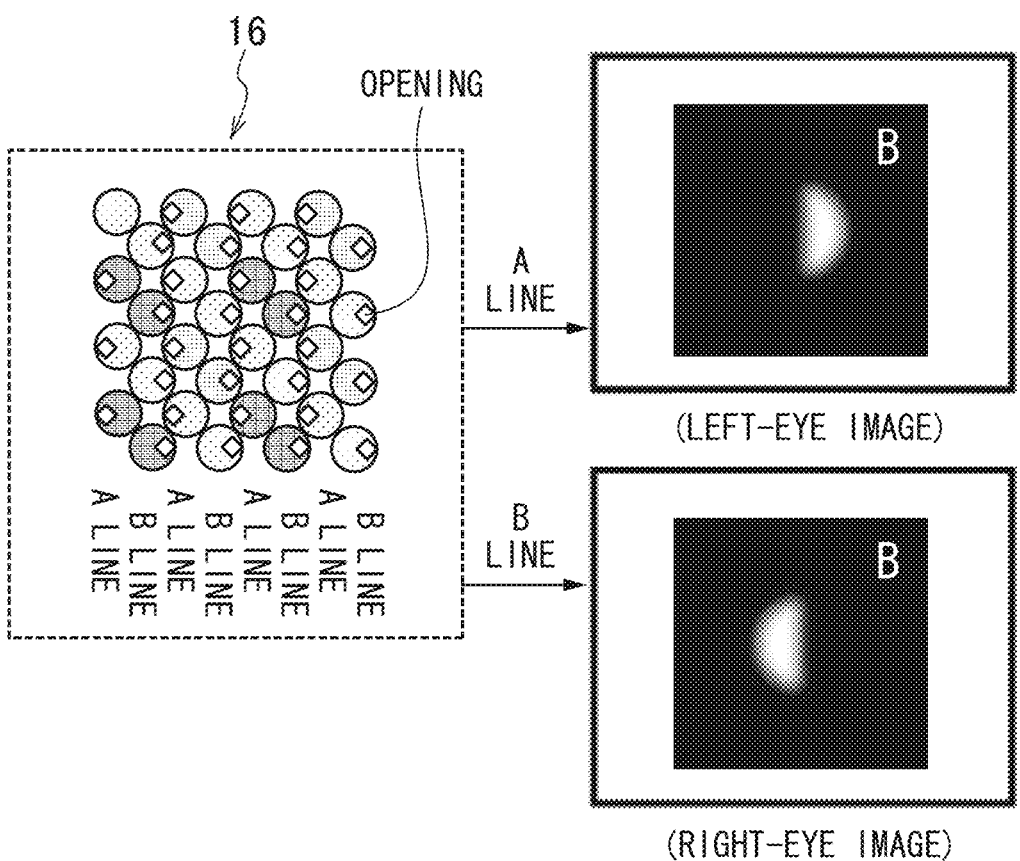
FIG. 9 is an explanatory diagram of a case where a point light source is imaged by pupil-division imaging, with the imaging element according to the example.
Figure 10:
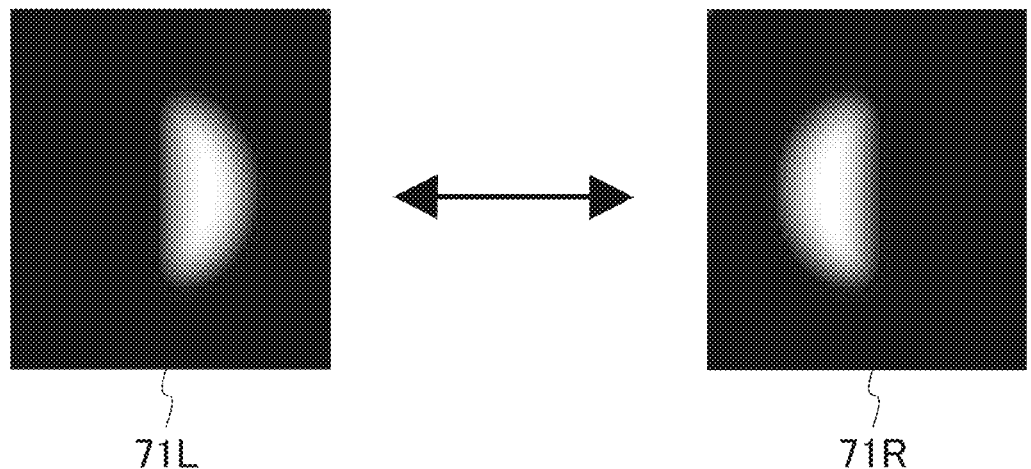
FIG. 10 is an explanatory diagram of an example of a left-eye image and right-eye image obtained by the pupil-division imaging of a point light source present at a closer position than a just-focus position.
Figure 11:
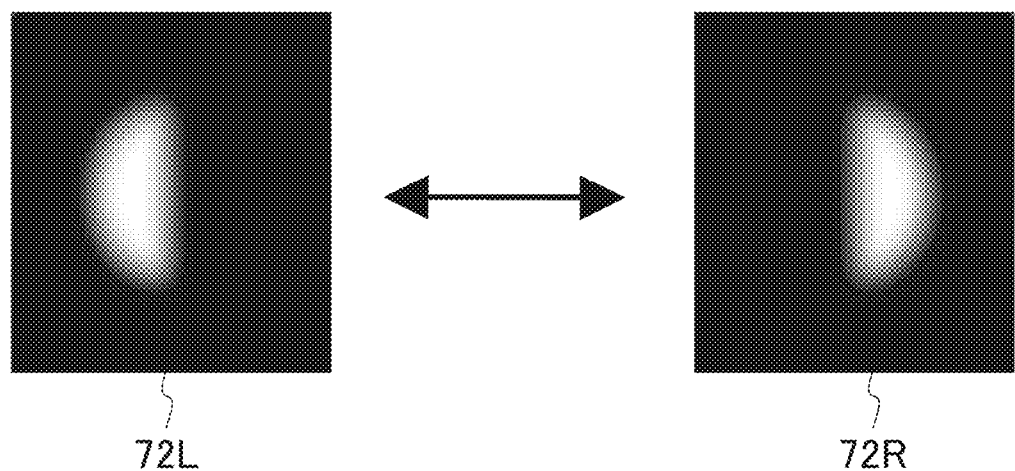
FIG. 11 is an explanatory diagram of an example of a left-eye image and right-eye image obtained by the pupil-division imaging of a point light source present at a more distant position than a just-focus position.

However, as shown in FIG. 9, when the imaging by the pupil-division scheme is performed with the imaging element 16 according to the example, a blurred semilunar image of the point light source is presented. FIG. 10 shows an example of a left-eye image 71L and a right-eye image 71R obtained by imaging a point light source present at a closer position than the just-focus position by the pupil-division scheme. FIG. 11 shows an example of a left-eye image 72L and a right-eye image 72R obtained by imaging a point light source present at a more distant position than the just-focus position by the pupil-division scheme.

Figure 12:
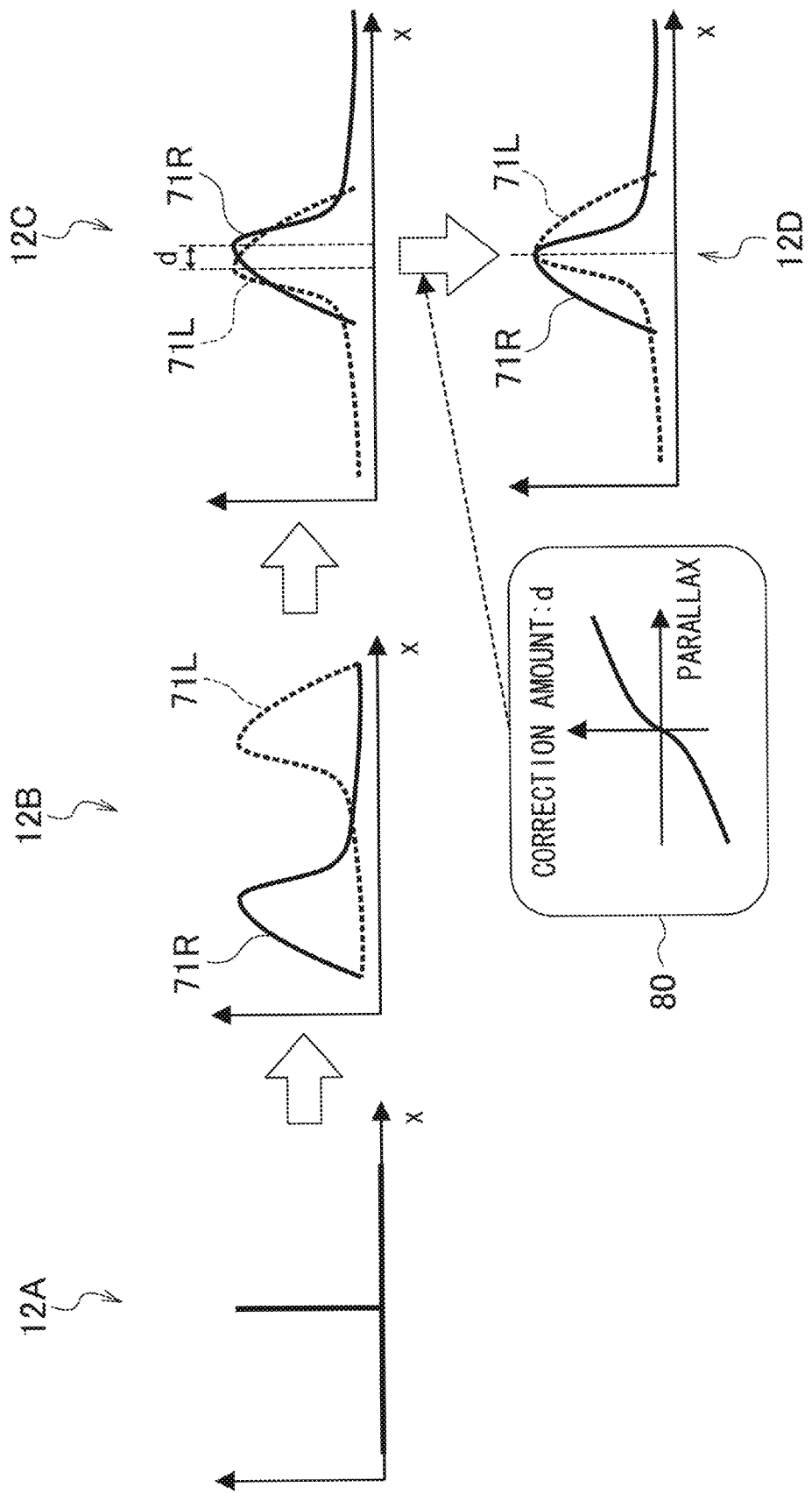
FIG. 12 is an explanatory diagram showing the difference between a calculated parallax and the deviation amount of the peak positions of pixel values.

Here, to take as an example the case shown in FIG. 10 (the case of imaging a point light source at a closer position than the just-focus position by the pupil-division scheme), the problem is explained using FIG. 12, by comparing the parallax to be calculated by the correlation and the parallax to be perceived by humans.

As shown in FIG. 12, if the point light source is present at the just-focus position, an ideal pulsed image signal is obtained as designated by reference character 12A. However, in the case where the point light source is present at a closer position than the just-focus position, the left-eye image 71L and right-eye image 71R that have a parallax is obtained as designated by reference character 12B.

Suppose that a parallax is calculated by performing the block matching and the right-eye image 71R is shifted in the x-axis direction by the calculated parallax. Then, as designated by reference character 12C, the peak position of the pixel values of the left-eye image 71L is sometimes inconsistent with the peak position of the pixel values of the right-eye image 71R. That is, it is not always true that the peak position of the pixel values of the left-eye image 71L is consistent with the peak position of the pixel values of the right-eye image 71R as designated by reference character 12D. This means that there is a slight difference between the parallax to be calculated by the correlation after the block matching (the calculated parallax) and the parallax to be perceived by humans (the deviation amount in the parallax direction for the object images that is indicated by the deviation amount of the peak positions).

However, even if attempting to detect the deviation amount of the peak positions through the operation by image processing, since the point light source is not always present in a real image-taking scene, the detection of the parallax is sometimes difficult. Therefore, in practice, it is preferable to perform the block matching and calculate the parallax by the correlation.

Then, as designated by reference numeral 80, it is preferable to use a look-up table (or a calculation formula) in which the calculated parallax (parallax amount) as the measurement result is the input parameter and a correction amount (a deviation amount d in reference character 12C) for correcting the calculated parallax is output.

Here, FIG. 12 explains, as an example, the case of using the parallax correction information (a look-up table or a calculation formula) that indicates the correspondence relationship between the calculated parallax and the correction amount (the difference between the calculated parallax and the deviation amount of the peak positions) for the calculated parallax. It can be said that this parallax correction information indirectly indicates the correspondence relationship between the calculated parallax and the deviation amount of the peak positions (the deviation amount in the parallax direction for the real object images). The parallax correction information (a look-up table or a calculation formula) that directly indicates the correspondence relationship between the calculated parallax and the deviation amount of the peak positions may be used.

Figure 13:
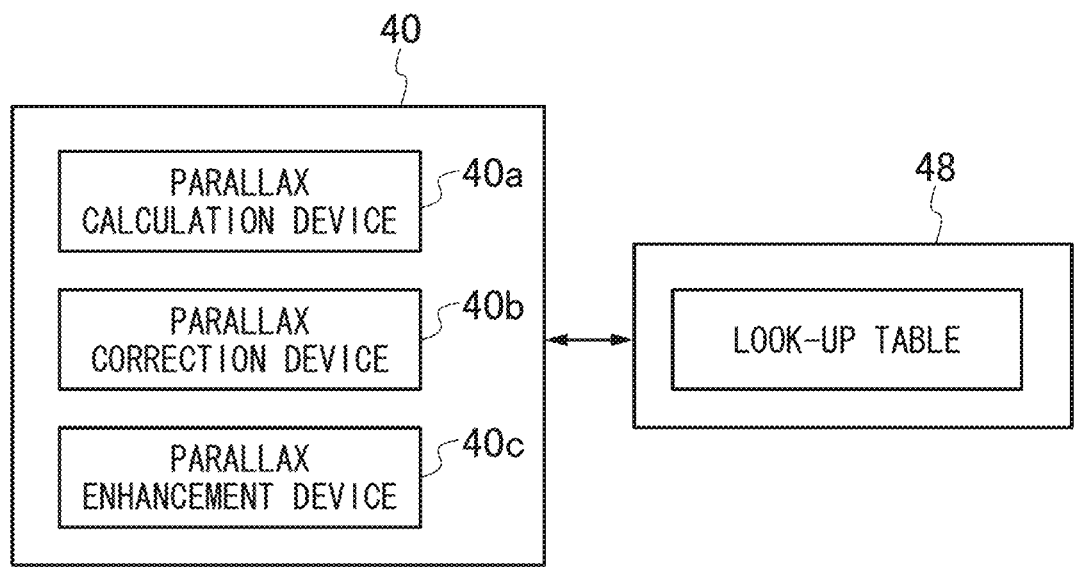
FIG. 13 is a block diagram showing an example of the functional and internal configuration of a CPU and a memory.

FIG. 13 is a block diagram showing an example of the functional and internal configuration of the CPU 40 and the memory 48 (storage device) according to the embodiment.

In FIG. 13, the memory 48 stores the parallax correction information for multiple viewpoint point light source images generated by the pupil-division imaging of a point light source, which indicates the relationship between the parallax calculated by the correlation between the point light source images (the calculated parallax) and the deviation amount of the peak positions of the pixel values between the point light source images (the deviation amount in the parallax direction for the real object images). In other words, the parallax correction information indicates the relationship between the calculated parallax between viewpoint images for multiple viewpoint images generated by the pupil-division imaging of an arbitrary subject and the deviation amount of the peak positions of the pixel values between the viewpoint images for the multiple viewpoint images (the deviation amount in the parallax direction for the real object images).

Hereinafter, the memory 48 according to the example stores, as the parallax correction information, a look-up table (or a functional calculation formula) that associates the calculated parallax with the correction amount d (the difference between the calculated parallax and the deviation amount of the peak positions).

The CPU 40 includes parallax calculation device 40a that, by the correlation, calculates the parallax (the calculated parallax) between the viewpoint images for the multiple viewpoint images generated by the pupil-division-scheme imaging with the imaging element 16, parallax correction device 40b that corrects the calculated parallax to the deviation amount of the peak positions (the deviation amount in the parallax direction for the real object images) based on the calculated parallax calculated by the parallax calculation device 40a and the parallax correction information stored in the memory 48, and the parallax enhancement device 40c that increases the parallax for the multiple viewpoint images corrected by the parallax correction device 40b. The parallax correction device 40b according to the example acquires the correction amount for correcting the calculated parallax calculated by the correlation, based on the look-up table (or the functional calculation formula) stored in the memory 48, and corrects the calculated parallax to the deviation amount of the peak positions, based on the acquired correction amount.

Here, the memory 48 may store a look-up table (or a functional calculation formula) that directly associates the calculated parallax with the deviation amount of the peak positions, as the parallax correction information. In this case, the parallax correction device 40b directly corrects the calculated parallax to the deviation amount of the peak positions, based on the parallax correction information.

As described above, the stereoscopic imaging device 10 according to the embodiment includes a first parallax amount calculation device (parallax calculation device 40a) for calculating a first parallax amount (calculated parallax) between viewpoint images for the multiple viewpoint images, a storage device (memory 48) that stores the parallax correction information indicating the relationship between the first parallax amount and the deviation amount in the parallax direction for the corresponding real object images, which is the deviation amount between the viewpoint images for the multiple viewpoint images and is caused by the pupil-division imaging, a second parallax amount calculation device (parallax correction device 40b) for calculating a second parallax amount resulting from correcting the first parallax amount to the deviation amount in the parallax direction for the real object images, based on the first parallax amount and the parallax correction information stored in the storage device (memory 48), and the parallax enhancement device 40c for increasing the second parallax amount for the multiple viewpoint images calculated by the second parallax amount calculation device (parallax correction device 40b).

Here, in the example, the matching between the viewpoint images (the acquisition of the correspondence relationship) is performed by the correlation-method operation process, and thereby, the first parallax amount is calculated. However, the present invention includes a case where the matching between feature points for the viewpoint images is performed using an operation process other than the correlation method, and thereby, the first parallax amount is calculated. Further, in the example, the first parallax amount is corrected to the deviation amount of the peak positions. However, the present invention includes a case where the second parallax amount is calculated by the information indicating the deviation amount in the parallax direction for the real object images that is other than the deviation amount of the peak positions.

Other examples of the matching between the viewpoint images include the matching by the KLT (Kanade Lucas Tomasi) method, the SIFT (Scale-Invariant Feature Transform) method or the like. In the case of using the KLT method or the SIFT method, feature points suitable for the matching are extracted from the multiple viewpoint images, and the matching between the feature points is performed for the viewpoint images. The KLT method exhibits a higher robustness than the correlation method, when there is a gap in the brightness of the whole image. The SIFT method has the advantage of being able to support the rotation and scaling of the image, although the processing time is long. Therefore, it is preferable to select an appropriate operation method depending on the processing speed, the diversity of imaging scenes and the like. Even when using the KLT method or the SIFT method, there is a difference between the calculated parallax calculated by the operation process of the matching between the feature points for the viewpoint images and the deviation amount in the parallax direction for the real object images. Therefore, it is preferable to apply the present invention and correct the calculated parallax to the deviation amount in the parallax direction for the real object images.

[Example of Correlation]

Examples of the function to be used for the correlation include the sum of squares (SSD). That is, the evaluation value of the degree of coincidence between blocks for both viewpoint images is calculated as the sum $\Sigma\{L(i,j)-R(i,j))\}^2$ of the squares of the differences between the respective pixel values $L(i, j)$ of a target block of the left-eye image and the respective pixel values $R(i, j)$ of a target block of the right-eye image. The example shows that the degree of coincidence between blocks becomes higher, as the sum of the squares, which is the evaluation value of the degree of coincidence between the blocks, becomes smaller.

Here, the calculation of the evaluation value of the degree of coincidence is not limited to the sum of squares (SSD). Examples thereof include the total sum (SAD), the cross-correlation (CC), the normalized cross-correlation (NCC), and the like.

The correlation in the present invention is not limited to the above example. Various methods (correlation methods) by which the parallax is calculated by performing the block matching between the multiple viewpoint images and analyzing the correlative relationship between the images in a unit of pixels or sub-pixels can be used.

[Correspondence Relationship Between Calculated Parallax and Correction Amount]

Figure 14:
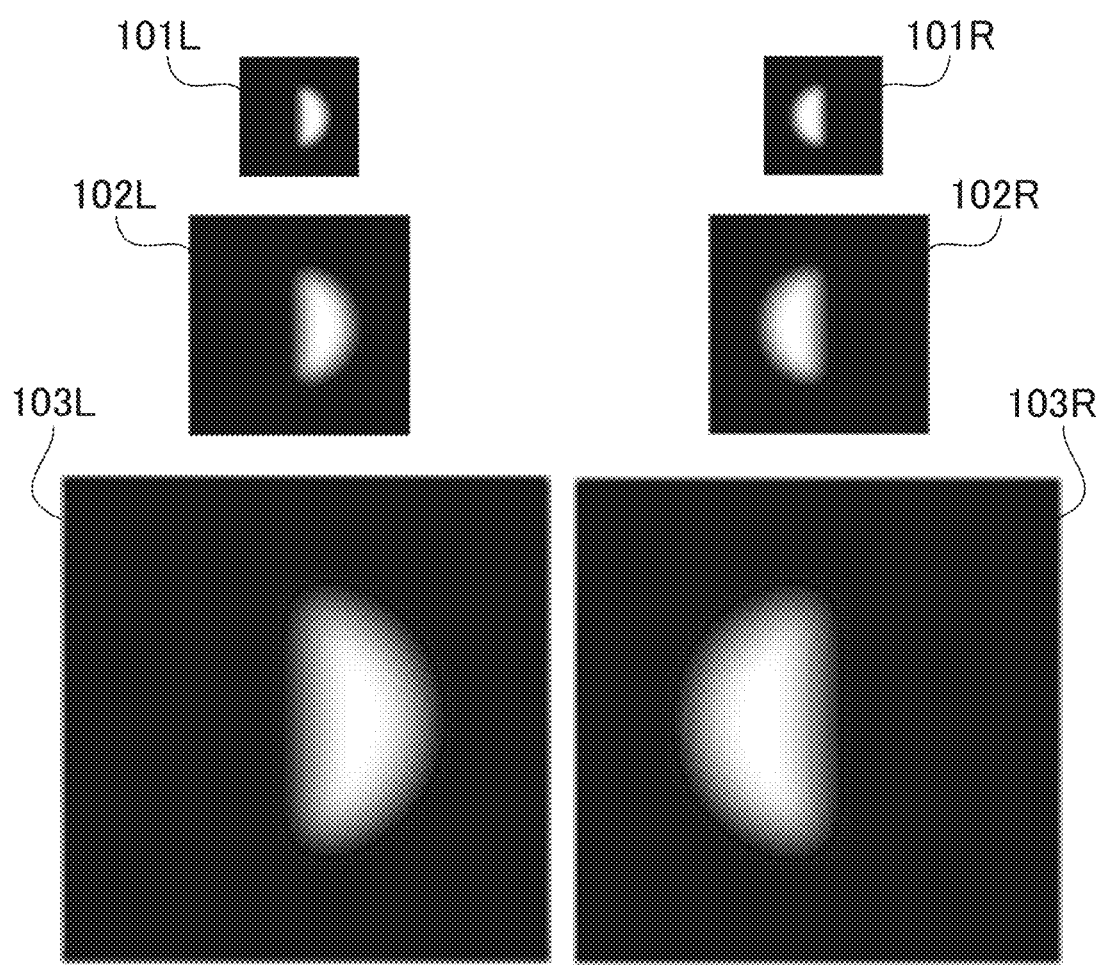
FIG. 14 is an explanatory diagram that is used for the explanation of the relationship among the distance from a point light source, the calculated parallax and the deviation amount of peak positions, and that shows left-eye images and right-eye images obtained by the pupil-division imaging of the point light source.

FIG. 14 shows an example of multiple viewpoint images (point light source images of multiple viewpoints) obtained when the point light source is placed at multiple positions that are closer than the just-focus position and that are different in the distance from the stereoscopic imaging device 10, and the point light source is imaged at the respective positions by the pupil-division scheme. In the example, the point light source is placed at closer positions than the just-focus position, and therefore, as the point light source becomes closer to the stereoscopic imaging device 10, the calculated parallax becomes larger and the blurred shape thereof becomes larger. In first multiple viewpoint images (a first left-eye image 101L and a first right-eye image 101R), the calculated parallax was 2.64 pixels, the deviation amount of the peak positions of the pixel values was 2.78 pixels, and the parallax correction amount was 0.14 pixels. In second multiple viewpoint images (a second left-eye image 102L and a second right-eye images 102R), the calculated parallax was 4.66 pixels, the deviation amount of the peak positions of the pixel values was 4.89 pixels, and the parallax correction amount was 0.23 pixels. In third multiple viewpoint images (a third left-eye image 103L and a third right-eye image 103R), the calculated parallax was 7.90 pixels, the deviation amount of the peak positions of the pixel values was 8.19 pixels, and the parallax correction amount was 0.29 pixels.

Here, the calculated parallax is a parallax that indicates the deviation amount between the position of the picture of the point light source in the left-eye image and the position of the picture of the point light source in the right-eye image and that is calculated by the correlation between the picture of the point light source in the left-eye image and the picture of the point light source in the right-eye image. The deviation amount of the peak positions of the pixel values (the deviation amount in the parallax direction for the real object images) is the deviation amount between the peak position of the pixel values in the left-eye image and the peak position of the pixel values in the right-eye image, and indicates the actual deviation amount of the pictures of the point light source. The parallax correction amount is the difference between the calculated parallax and the deviation amount of the peak positions of the pixel values.

As shown in FIG. 14, when the point light source is placed closer than the just-focus position, as the placed position of the point light source becomes closer, the calculated parallax becomes larger and the size of the picture of the point light source in the image becomes larger, so that also the parallax correction amount, which is the difference between the calculated parallax and the deviation amount of the peak positions of the pixel values, becomes larger. Here, when the point light source is placed more distantly than the just-focus position, as the placed position of the point light source becomes more distant, the calculated parallax becomes larger and the size of the picture of the point light source in the image becomes larger, so that also the parallax correction amount, which is the difference between the calculated parallax and the deviation amount of the peak positions of the pixel values, becomes larger.

Figure 15:
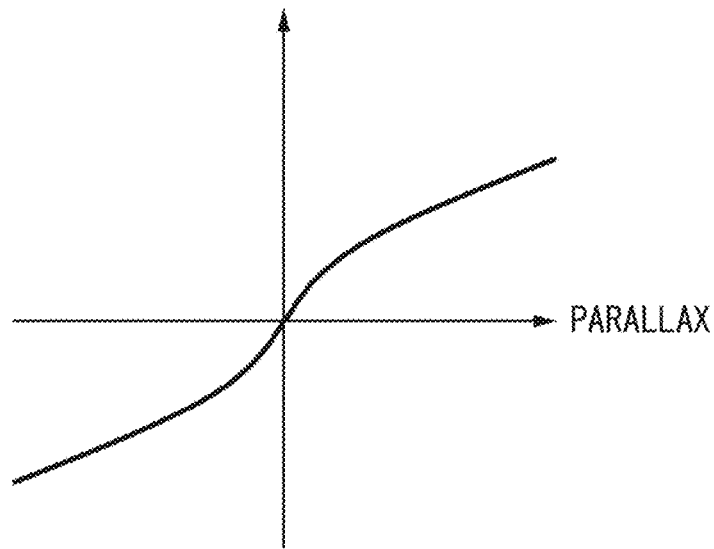
FIG. 15 is a graph showing an example of the correspondence relationship between the calculated parallax and the parallax correction amount.

FIG. 15 is a graph showing an example of the correspondence relationship between the calculated parallax and the parallax correction amount. As explained using FIG. 14, this graph is generated as the information indicating the parallax correction amount for an arbitrary parallax, by placing the point light source at multiple positions that are different in distance, imaging the point light source for each placed position of the point light source by the pupil-division scheme, determining the parallax correction amount that is the difference between the parallax calculated by the correlation (the calculated parallax) and the deviation amount of the peak positions of the pixel values (the deviation amount in the parallax direction for the real object images), and then performing the interpolation process.

As shown in FIG. 14, the parallax correction amount has a certain correlative relationship, to the parallax to be calculated by the correlation (the calculated parallax). The relationship between the calculated parallax and the parallax correction amount is surveyed in advance to be determined, and is stored as a look-up table (LUT). The parallax correction amount may be calculated by representing the relationship between the calculated parallax and the parallax correction amount as a function and using the parallax calculated by the correlation as the parameter. The parallax correction amount may be calculated by simulation. Further, the direct relationship between the calculated parallax and the deviation amount in the parallax direction for the real object images may be stored as a look-up table (LUT), or the direct relationship between the calculated parallax and the deviation amount in the parallax direction for the real object images may be represented as a function.

In the example, the multiple viewpoint images are imaged by the pupil division with the imaging element 16 having the imaging surface 16C on which multiple photoelectric conversion elements are arranged, the memory 48 stores the parallax correction information for each of the different positions on the imaging surface 16C of the imaging element 16, and the parallax calculation device 40a (the second parallax amount calculation device) acquires, from the memory 48, the parallax correction information for each of the positions on the imaging surface 16C of the imaging element 16 that correspond to the positions in the multiple viewpoint images, and corrects the calculated parallax based on the acquired parallax correction information.

[Relationship Between Color Channel and Parallax Correction Amount]

Figure 16:
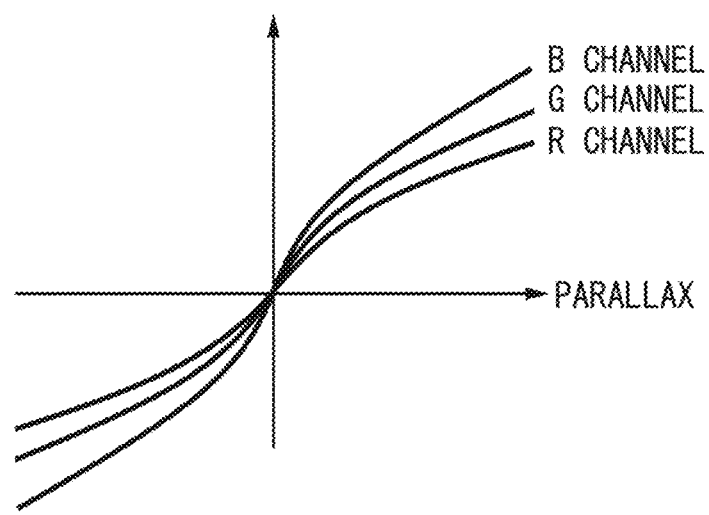
FIG. 16 is a graph showing an example of the correspondence relationship between the calculated parallax and the parallax correction amount for each color channel.

FIG. 16 is a graph showing an example of the correspondence relationship between the calculated parallax and the parallax correction amount for each color channel. As shown in FIG. 16, the correspondence relationship between the calculated parallax and the parallax correction amount varies by color channel.

Here, the color channel is a series of same-color pixels in the viewpoint images that corresponds to each color (R, G, B) of the color filters included in the pixels of the imaging element 16.

In the photoelectric conversion element with the color filters that are arranged on the imaging surface 16C of the imaging element 16, generally, B (blue) has the highest refractive index of R, G and B, and therefore, in the taken images (multiple viewpoint images), the size of the blurred shape for the B channel (B pixel series) is large compared to the sizes of the blurred shapes for the R channel and G channel. Therefore, generally, when the difference (parallax correction amounts) between the calculated parallax and the deviation amount of the peak values of the pixel values is calculated for each color channel (for each of R, G and B), as for the absolute values of the calculated differences (parallax correction amounts), R<G<B holds.

Hence, the memory 48 according to the example stores a look-up table (or a function) for outputting the parallax correction amount, for each color channel. The parallax correction amount is the difference between the parallax for the point light source calculated by the correlation for each color channel (the calculated parallax) and the deviation amount of the peak positions of the pixel values calculated for each color channel (the deviation amount in the parallax direction for the real object images). That is, the memory 48 stores the look-up table (or the function), for each of the colors of the pixels of the imaging element 16 to image the multiple viewpoint images (the colors of the color filters included in the photodiodes PD).

The parallax correction device 40b according to the example acquires, from the memory 48, the difference (parallax correction amount) between the parallax for the point light source calculated by the correlation (the calculated parallax) and the deviation amount of the peak positions of the pixel values (the deviation amount in the parallax direction for the real object images), for each color channel, and corrects the parallax (the calculated parallax) in the multiple viewpoint images, for each color channel, based on the acquired difference.

Thereby, it is possible to correct the parallax by an appropriate correction amount, even when the refractive index varies by color channel.

Here, the example is not limited to the case of performing the parallax correction for each color channel as described above. The information (the correspondence relationship between the calculated parallax and the deviation amount in the parallax direction for the real object images) for the G channel, which has the greatest correlation to the luminance, may be stored in the memory 48 in advance, and the parallax correction for the other color channels may be performed based on the information for the G channel.

[Relationship Between Positions in Screen and Parallax Correction Amount]

Figure 18:
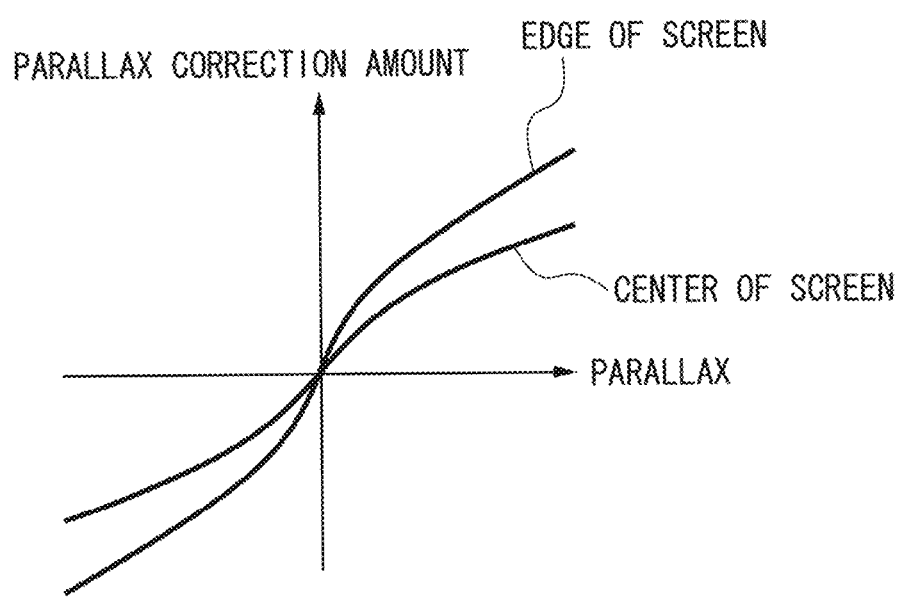
FIG. 18 is a graph showing an example of the correspondence relationship between the calculated parallax and the parallax correction amount for each position in the screen.

FIG. 17 is an explanatory diagram that is used for the explanation of the relationship among the position in a screen, the calculated parallax and the deviation amount of the peak positions, and that shows left-eye images and right-eye images obtained by the pupil-division imaging of the point light source. FIG. 18 is a graph showing an example of the correspondence relationship between the calculated parallax and the parallax correction amount for each of the positions (the center and the edges) in the screen.

Here, the positions in the screen involve a screen corresponding to the imaging surface 16C on which the photoelectric conversion elements of the imaging element 16 are arranged and comparable to the whole region of a taken image (viewpoint image).

In the photoelectric conversion elements (photodiodes PD) arranged on the imaging surface 16C of the imaging element 16, the light incidence angles are different between the center and edges of the imaging surface. Therefore, generally, in the whole region of the taken image corresponding to the imaging surface 16C of the imaging element 16, the blurred shape of the picture of the point light source at the center position and the blurred shape of the point light source at both edges of left and right are different.

Hence, the memory 48 according to the example stores a look-up table (or a function) for outputting the parallax correction amount, for each position in the screen. That is, the memory 48 stores a look-up table (or a table) for each of the different positions on the imaging surface of the imaging element 16 to image the multiple viewpoint images. The parallax correction amount is the difference between the parallax for the point light source calculated by the correlation for each position in the screen (the calculated parallax) and the deviation amount of the peak positions of the pixel values calculated for each position of the screen (the deviation amount in the parallax direction for the real object images). That is, the memory 48 stores the parallax correction amount for each of predetermined positions in the whole region of the taken image. Here, the predetermined positions only have to be two or more positions in the screen. For example, only the parallax correction amount at the center position in the screen and the parallax correction amounts at both edge positions of left and right may be stored in the memory 48.

The parallax correction device 40b according to the example reads the parallax correction amount for each position in the screen, from the memory 48, and corrects the calculated parallax for the multiple viewpoint images, for each position in the screen, based on the read difference.

Thereby, even when the light incidence angles are different depending on the position in the imaging surface 16C of the imaging element 16 and thereby the blurred shapes are different depending on the position in the screen corresponding to the taken image, it is possible to correct the parallax by an appropriate correction amount.

Here, although FIG. 18 exemplifies only the center of the screen and the edge of the screen, the number of the positions in the screen is not particularly limited. In order to increase the accuracy, the parallax correction amount may be managed by the look-up table or the function, for each position of many (for example, sixteen) positions in the screen.

Further, in order to perform the management and correction of the parallax correction amount by a simple process, the screen may be divided into multiple strip-shaped regions in the left-right direction, and the parallax correction amount may be switched depending on the region. However, in terms of the increase in the accuracy of the correction, it is preferable to switch the parallax correction amount smoothly, depending on the left-right-directional position in the screen.

[Relationship with Diaphragm Value (F-Value)]

Further, it is preferable to change the parallax correction depending on the F-value. In this case, the memory 48 may store the parallax correction amount for each F-value of the image-taking optical system 11, and the parallax correction device 40*b* may read the parallax correction amount from the memory 48, by using, as a parameter, the F-value when the multiple viewpoint images are imaged using the image-taking optical system 11, and may correct the calculated parallax for the multiple viewpoint images, based on the read parallax correction amount.

[Parallax Enhancement]

Figure 19:
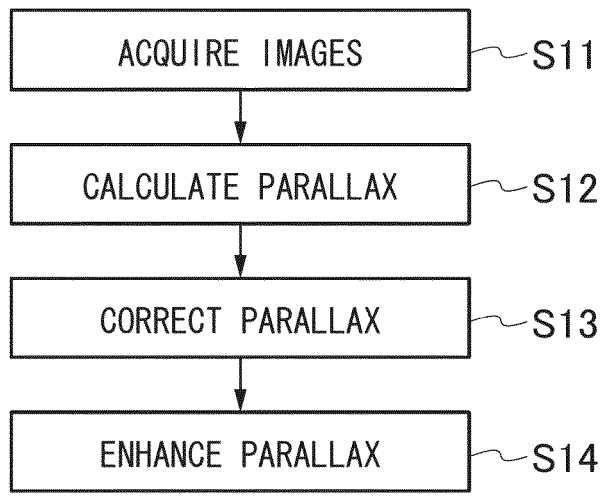
FIG. 19 is a flowchart showing the flow of an exemplary image process in the case of performing a parallax enhancement.

FIG. 19 is a flowchart showing the flow of an exemplary image process in the case of performing a parallax enhancement.

Here, in the memory 48, the difference between the parallax for the point light source calculated by the correlation and the deviation amount of the peak positions of the pixel values, in the point light source images (the left-eye image and the right-eye image) for the multiple viewpoints that are obtained by the pupil-division imaging of the point light source, is stored as the parallax correction amount in advance, for each parallax of the point light source.

First, the multiple viewpoint images (the left-eye image and the right-eye image) in which an arbitrary subject has been imaged by the pupil division are acquired (step S11). Here, the multiple viewpoint images do not contain a point light source as the subject.

Next, the parallax for the multiple viewpoint images acquired is calculated by the correlation (step S12).

Next, the parallax correction amount corresponding to the parallax for the multiple viewpoint images calculated by the correlation is read from the memory 48, and the parallax for the multiple viewpoint images calculated by the correlation is corrected based on the read parallax correction amount (step S13).

Next, the parallax enhancement for increasing the corrected parallax for the multiple viewpoint images is executed (step S14).

[Multi-Viewpoint Image Generation]

Figure 20:
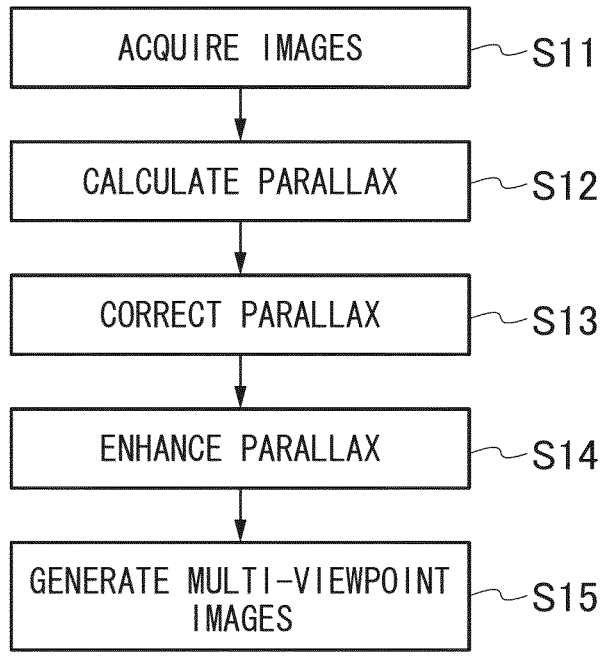
FIG. 20 is a flowchart showing the flow of an exemplary image process in the case of performing a multi-viewpoint image generation.

FIG. 20 is a flowchart showing the flow of an exemplary image process in the case of performing a multi-viewpoint image generation.

Steps S11 to 14 are the same as the exemplary image process in FIG. 19.

According to the example, in step S15, multi-viewpoint images that are different in the number of viewpoints from the multiple viewpoint images acquired in step S11 are generated, based on the parallax for the multiple viewpoint images corrected in step S13.

[Phase-Difference AF]

Figure 21:
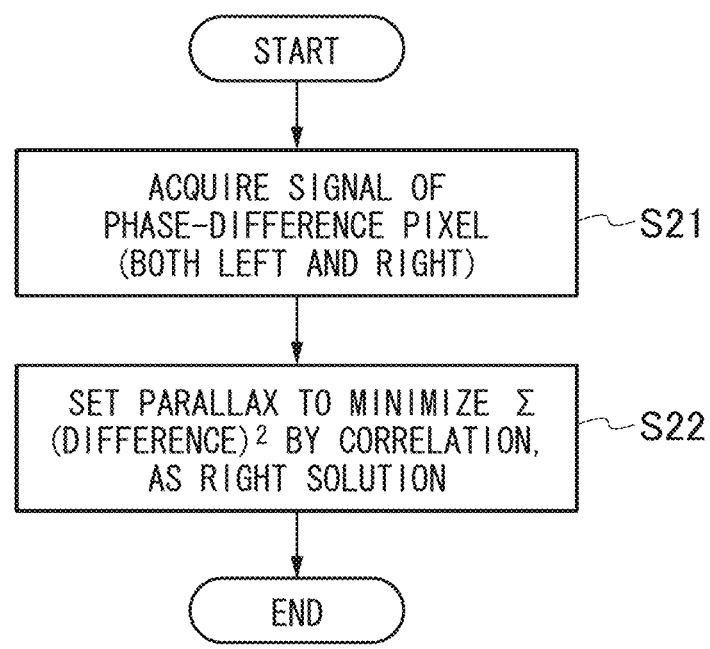
FIG. 21 is a flowchart showing the flow of an exemplary conventional phase-difference AF process.
Figure 22:
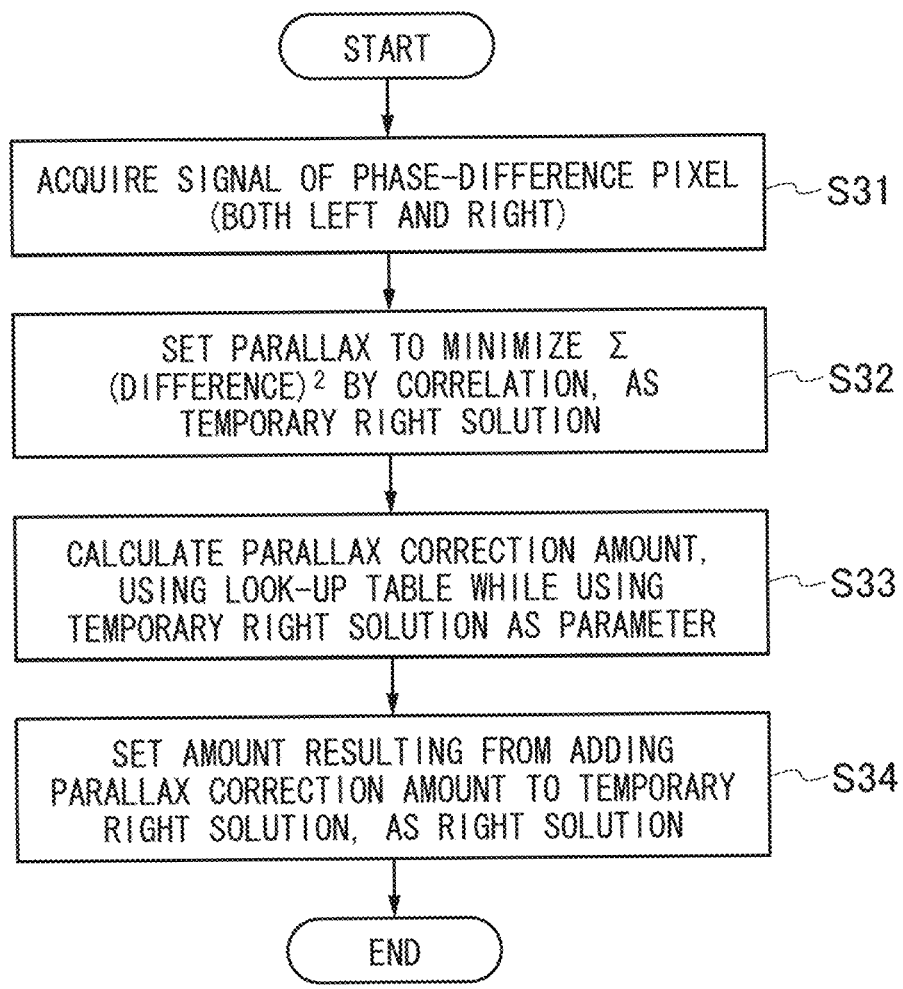
FIG. 22 is a flowchart showing the flow of an exemplary phase-difference AF process to which the present invention is applied.

FIG. 21 is a flowchart showing the flow of an exemplary conventional phase-difference AF (autofocus) process, and FIG. 22 is a flowchart showing the flow of an exemplary phase-difference AF process to which the present invention is applied.

As shown in FIG. 21, in a conventional phase-difference AF process, when the signals of left and right phase-difference pixels are acquired (step S21), a parallax as the defocus amount is determined by a correlation (step S22). For example, as the correlation, by the least squares method, the squares of the difference of the pixel values between the left and right phase-difference pixels are summed for a predetermined region, and a parallax to minimize the total sum is set as the defocus amount of the right solution.

As shown in FIG. 22, in a phase-difference AF process according to the example, when the signals of left and right phase-difference pixels are acquired (step S31), a parallax as the defocus amount is determined by the correlation as a temporary right solution (step S32), the parallax correction amount is calculated using the look-up table in the memory 48 while using the temporary right solution as the parameter (step S33), and an amount resulting from adding the parallax correction amount to the temporary right solution determined in step S32 is set as the right solution of the defocus amount (step S34).

As explained above, the image processing method according to the present invention includes the step for acquiring the multiple viewpoint images that are generated by the pupil-division-scheme imaging and that are different in viewpoint, the step for calculating the first parallax amount between the viewpoint images for the multiple viewpoint images, and the step for calculating the second parallax amount, which results from correcting the first parallax amount to the deviation amount in the parallax direction for the real object images, based on the first parallax amount and the parallax correction information stored in the memory 48. The parallax correction information, which indicates the relationship between the first parallax amount and the deviation amount in the parallax direction for the corresponding real object images that is a deviation amount between the viewpoint images for the multiple viewpoint images and that is caused by the pupil-division-scheme imaging, is stored in the memory 48 in advance.

Here, for facilitating understanding of the present invention, FIG. 21 and FIG. 22 show the flows to the determination of the defocus amount. However, in practice, the focus lens of the image-taking optical system 11 is moved in the optical axis direction of the image-taking optical system 11, based on the calculated defocus amount, and thereby, a process of the focusing of the focus lens on the target subject is also performed.

So far, to take the stereoscopic imaging device (digital camera) 10 as an example, the portable electronic apparatus has been explained, but the configuration of the portable electronic apparatus is not limited to this. Other examples of the portable electronic apparatus to which the present invention is applied can include a built-in or external camera for a PC, and a portable terminal device having an image-taking function explained below.

As a portable terminal device that is a second embodiment of the portable electronic apparatus according to the present invention, for example, there are a portable telephone, a smart phone, a PDA (Personal Digital Assistants), and a portable game machine. In the following, to take a smart phone as an example, the detail is explained with reference to the drawings.

<Configuration of Smart Phone>

Figure 23:
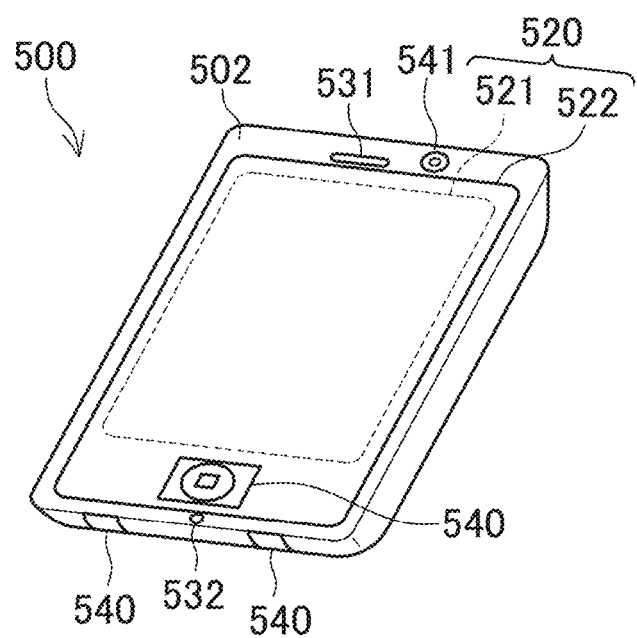
FIG. 23 is an external view of a smart phone as a portable electronic apparatus that is another embodiment of the image processing device according to the present invention.

FIG. 23 shows an external view of a smart phone 500 that is another embodiment of the portable electronic apparatus according to the present invention. The smart phone 500 shown in FIG. 23 has a case 502 in a flat plate shape, and, on one surface of the case 502, includes a display/input unit 520 in which a display panel 521 as a display unit and an operation panel 522 as an input unit are unified. Further, the case 502 is provided with a speaker 531, a microphone 532, an operation unit 540 and a camera unit 541. Here, the configuration of the case 502 is not limited to this. For example, a configuration in which the display unit and the input unit are separated can be adopted, or a configuration of having a folding structure or a sliding mechanism can be adopted.

Figure 24:
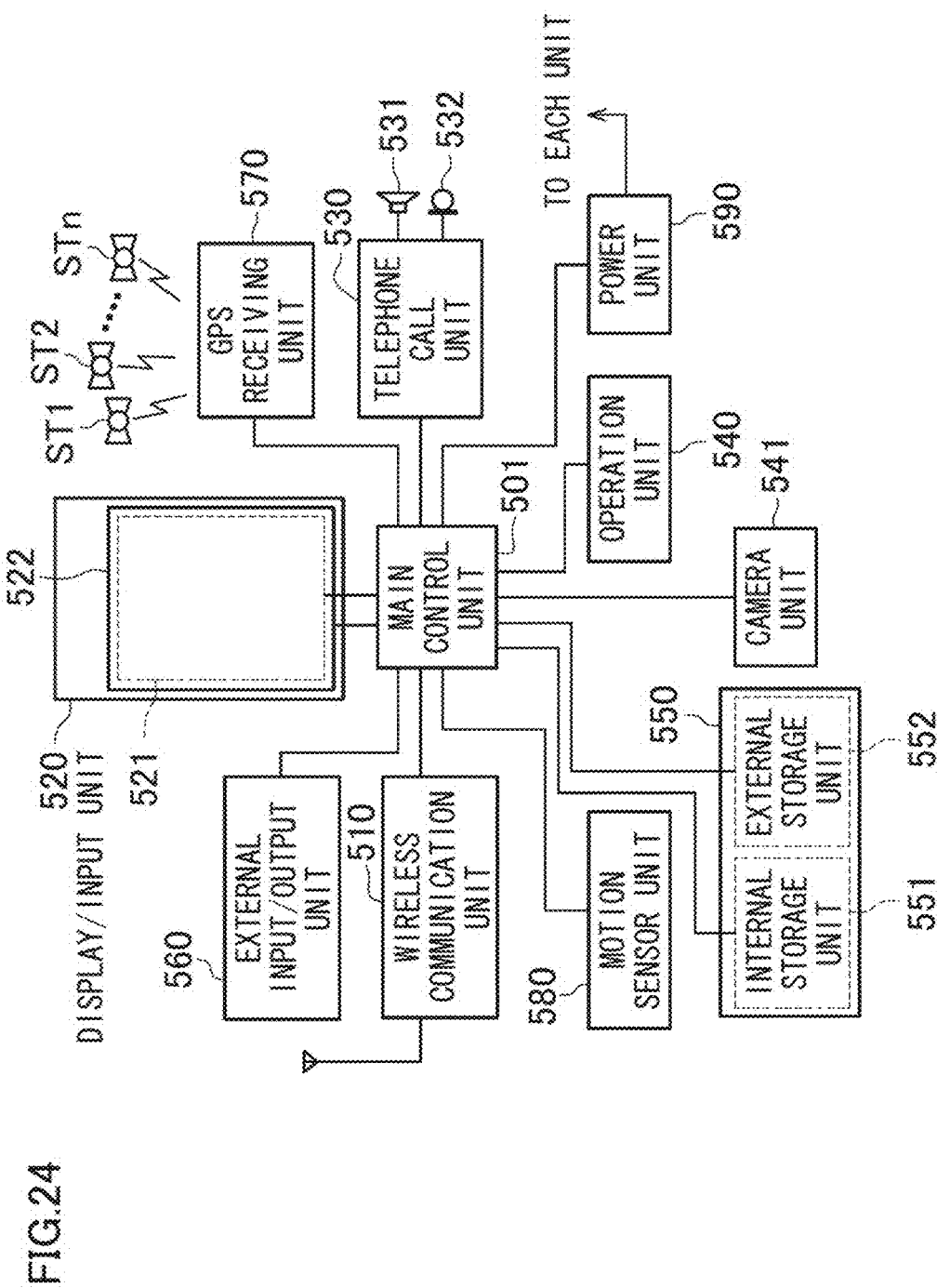
FIG. 24 is a block diagram showing the configuration of the above smart phone.

FIG. 24 is a block diagram showing the configuration of the smart phone 500 shown in FIG. 23. As shown in FIG. 24, the smart phone includes a wireless communication unit 510, the display/input unit 520, a telephone call unit 530, the operation unit 540, the camera unit 541, a storage unit 550, an external input/output unit 560, a GPS (Global Positioning System) receiving unit 570, a motion sensor unit 580, a power unit 590, and a main control unit 501, as the main constituent elements. Further, the smart phone 500 has a wireless communication function to perform the mobile wireless communication through a base station device BS and a mobile communication network NW, as the main function.

The wireless communication unit 510 performs a wireless communication with a base station device BS contained in a mobile communication network NW, in accordance with an instruction of the main control unit 501. Using the wireless communication, the sending and receiving of various file data such as audio data and image data, e-mail data or the like, and the receiving of Web data, streaming data or the like are performed.

The display/input unit 520 is a so-called operation panel that, by the control from the main control unit 501, displays an image (a still image and a moving image), character information or the like to visually transmit the information to a user, and therewith, detects the user operation to the displayed information, and includes the display panel 521 and the operation panel 522.

The display panel 521 is an LCD (Liquid Crystal Display), an OELD (Organic Electro-Luminescence Display) or the like that is used as a display device. The operation panel 522 is a device that is placed such that an image to be displayed on the display surface of the display panel 521 can be visually recognized and that detects a single or multiple coordinates to be operated by a finger of a user or a stylus. When this device is operated by a finger of a user or a stylus, a detection signal generated due to the operation is output to the main control unit 501. Next, the main control unit 501 detects the operation position (coordinate) on the display panel 521, based on the received detection signal.

As shown in FIG. 23, the display panel 521 and operation panel 522 of the smart phone 500 are unified to constitute the display/input unit 520, and are arranged such that the operation panel 522 completely covers the display panel 521. In the case of adopting this arrangement, the operation panel 522 may have the function to detect the user operation, also in the region outside the display panel 521. In other words, the operation panel 522 may include a detection region that is the superposition part overlapping with the display panel 521 (hereinafter, referred to as a display region), and a detection region that is other than it and that is the outer edge part not overlapping with the display panel 521 (hereinafter, referred to as a non-display region).

Here, the size of the display region and the size of the display panel 521 may accord completely, but both does not always need to accord. Further, the operation panel 522 may include two sensitive regions: the outer edge part and the inner part that is other than it. Moreover, the width of the outer edge part is appropriately designed depending on the size of the case 502 and the like. Furthermore, examples of the position detection scheme to be adopted in the operation panel 522 include a matrix switch scheme, a resistive film scheme, a surface acoustic wave scheme, an infrared ray scheme, an electromagnetic induction scheme and an electrostatic capacity scheme, and any scheme can be adopted.

The telephone call unit 530, which includes the speaker 531 and the microphone 532, converts a user voice input through the microphone 531 into audio data capable of being processed in the main control unit 501, to output it to the main control unit 501, and decodes audio data received by the wireless communication unit 510 or the external input/output unit 560, to output it from the speaker 531. Further, as shown in FIG. 23, for example, the speaker 531 may be mounted on the same surface as the surface on which the display/input unit 520 is provided. Further, the microphone 532 can be mounted on the side surface of the case 502.

The operation unit 540 is a hardware key using a key switch or the like, and receives an instruction from a user. For example, as shown in FIG. 23, the operation unit 540, which is mounted on the lower surface below the display unit of the case 502 of the smart phone 500, is a push-button switch that is turned on when being pushed by a finger or the like and becomes the off state by the restring force of a spring or the like when the finger is released.

The storage unit 550 stores a control program and control data of the main control unit 501, application software, address data associated with the name, telephone number and others of a communication partner, sent or received e-mail data, Web data downloaded by Web browsing, and downloaded content data, and further, temporarily stores streaming data or the like. Further, the storage unit 550 is constituted by an internal storage unit 551 built in the smart phone, and an external storage unit 552 having a detachable external memory slot. Here, each of the internal storage unit 551 and the external storage unit 552 that constitute the storage unit 550 is implemented by using a storing medium such as a flash memory type memory, a hard disk type memory, multimedia card micro type memory, card type memory (for example, Micro SD (R) memory or the like), a RAM (Random Access Memory), or a ROM (Read Only Memory).

The external input/output unit 560 plays a role as an interface to all external apparatuses that is linked with the smart phone 500, and is directly or indirectly connected with another external apparatus, through a communication (for example, the universal serial bus (USB), IEEE1394 or the like), or a network (for example, the internet, a wireless LAN, Bluetooth (R), RFID (Radio Frequency Identification), the infrared communication (Infrared Data Association: IrDA) (R), UWB (Ultra Wideband) (R), ZigBee (R), or the like).

Examples of the external apparatus to be linked with the smart phone 500 include a wired or wireless headset, a wired or wireless external battery charger, a wired or wireless data port, a memory card or SIM (Subscriber Identity Module Card)/UIM (User Identity Module Card) card to be connected through a card socket, an external audio and video apparatus to be connected through an audio and video I/O (Input/Output) terminal, an external audio and video apparatus to be connected by wireless, a smart phone to be connected by wire or wirelessly, a personal computer to be connected by wire or wirelessly, a PDA to be connected by wire or wirelessly, a personal computer to be connected by wire or wirelessly, an earphone, and the like. The external input/output unit 560 allows data transferred from such an external apparatus to be transmitted to each constituent element in the interior of the smart phone 500, and allows data in the interior of the smart phone 500 to be transferred to an external apparatus.

The GPS receiving unit 570, in accordance with an instruction of the main control unit 501, receives GPS signals sent from GPS satellites ST1 to STn, executes a positioning operation process based on the multiple GPS signals received, and detects the position of the smart phone 500 by the latitude, longitude and altitude. When the position information can be acquired from the wireless communication unit 510 or the external input/output unit 560 (for example, a wireless LAN), the GPS receiving unit 570 can detect the position using the position information.

The motion sensor unit 580 includes, for example, a three-axis acceleration sensor and the like, and detects the physical motion of the smart phone 500 in accordance with an instruction of the main control unit 501. The detection of the physical motion of the smart phone 500 leads to the detection of the moving direction and acceleration of the smart phone 500. This detection result is output to the main control unit 501.

The power unit 590 supplies the electric power stored in a battery (not shown in the figure), to each unit of the smart phone 500, in accordance with an instruction of the main control unit 501.

The main control unit 501, which includes a microprocessor, operates in accordance with the control program and control data stored in the storage unit 550, and integrally controls each unit of the smart phone 500. Further, the main control unit 501 has a mobile communication control function to control each unit of the communication system, and an application processing function, for performing a voice communication and a data communication through the wireless communication unit 510.

The main control unit 501 operates in accordance with the application software stored in the storage unit 550, and thereby, the application processing function is implemented. Examples of the application processing function include an infrared communication function to perform the data communication with a facing apparatus by controlling the external input/output unit 560, an e-mail function to perform the sending and receiving of an e-mail message, a Web browsing function to browse a Web page, and the like.

Further, the main control unit 501 has an image processing function such as the display of a picture to the display/input unit 520, based on image data (still image or moving image data) such as received data or downloaded streaming data. The image processing function is a function by which the main control unit 501 decodes the above image data, performs an image process to the decoded result, and displays the image to the display/input unit 520.

Moreover, the main control unit 501 executes the display control to the display panel 521, and the operation detection control for detecting a user operation through the operation unit 540 or the operation panel 522.

By the execution of the display control, the main control unit 501 displays software keys such as an icon for activating application software and a scroll bar, or displays a window for composing an e-mail message. Here, the scroll bar is a software key for receiving an instruction to move the display part of an image that is too large to fit inside the display region of the display panel 521, or the like.

Further, by the execution of the operation detection control, the main control unit 501 detects a user operation through the operation unit 540, receives an operation to the above icon and an input of a character string to an input box of the above window, or receives a scroll request of the display image through the scroll bar.

Moreover, by the execution of the operation detection control, the main control unit 501 has an operation panel control function to decide whether the operation position to the operation panel 522 is the superposition part (display region) overlapping with the display panel 521 or, other than it, the outer edge part (non-display region) not overlapping with the display panel 521, and to control the sensitive region of the operation panel 522 and the display position of the software keys.

Further, the main control unit 501 can detect a gesture operation to the operation panel 522, and can execute a previously set function in response to the detected gesture operation. The gesture operation device not a conventional simple touch operation, but an operation to draw a track from at least one of multiple positions by drawing the track by a finger or the like, by designating multiple positions simultaneously, or by combining them.

The camera unit 541 is a digital camera that performs an electronic image-taking using an imaging element such as a CMOS (Complementary Metal Oxide Semiconductor) or a CCD (Charge-Coupled Device). Further, by the control of the main control unit 501, the camera unit 541 can convert image data obtained by the imaging, into compressed image data such as JPEG (joint Photographic coding Experts Group), for example, and can record them in the storage unit 550, or output them through the external input/output unit 560 or the wireless communication unit 510. In the smart phone 500 shown in FIG. 23, the camera unit 541 is mounted on the same surface as the display/input unit 520. However, the mount position of the camera unit 541 is not limited to this, and it may be mounted on the back surface of the display/input unit 520. Alternatively, multiple camera units 541 may be mounted. Here, in the case where the multiple camera units 541 are mounted, it is possible to switch a camera unit 541 to be used for an image taking to perform the image taking independently, and to use the multiple camera units 541 simultaneously to perform an image taking.

Further, the camera unit 541 can be utilized for various functions of the smart phone 500. For example, an image acquired by the camera unit 541 can be displayed on the display panel 521, and an image of the camera unit 541 can be utilized as one operation input of the operation panel 522. Further, when the GPS receiving unit 570 detects the position, it can detect the position by referring to an image from the camera unit 541. Moreover, by referring to an image from the camera unit 541, it is possible to decide the optical axis direction of the camera unit 541 of the smart phone 500, and to decide the current usage environment without using a three-axis acceleration sensor or using a three-axis acceleration sensor together. Naturally, it is possible to utilize an image from the camera unit 541 within the application software.

In addition, it is possible to add the position information acquired by the GPS receiving unit 570, the voice information acquired by the microphone 532 (it may be the text information after the voice-text conversion by the main control unit or the like), the attitude information acquired by the motion sensor unit 580, or the like, to image data of still image or moving image, to store them in the storage unit 550, and to output them through the external input/output unit 560 or the wireless communication unit 510.

Here, the present invention is not limited to the examples explained in the specification and the examples illustrated in the drawings. Naturally, various design alternations and improvements may be made without departing from the scope of the present invention.

What is claimed is:

1. An image processing device comprising:
an image acquisition device configured to acquiring multiple viewpoint images generated by pupil-division imaging, the multiple viewpoint images being different in viewpoint;
a first parallax amount calculation device configured to calculating a first parallax amount between viewpoint images for the multiple viewpoint images;
a storage device in which parallax correction information is stored, the parallax correction information indicating a relationship between the first parallax amount and a deviation amount in a parallax direction for corresponding object images, the deviation amount being a deviation amount between viewpoint images for the multiple viewpoint images and being caused by the pupil-division imaging; and
a second parallax amount calculation device configured to calculating a second parallax amount based on the first parallax amount and the parallax correction information stored in the storage device, the second parallax amount being an amount resulting from correcting the first parallax amount to the deviation amount in the parallax direction for the object images.

2. The image processing device according to claim 1, wherein the deviation amount in the parallax direction for the object images is a deviation amount of peak positions of pixel values of the object images between viewpoint images for the multiple viewpoint images, and
the second parallax amount calculation device calculates the second parallax amount that is an amount resulting from correcting the first parallax amount to the deviation amount of the peak positions of the pixel values of the object images.

3. The image processing device according to claim 1, wherein the first parallax amount calculation device calculates the first parallax amount by correlation.

4. The image processing device according to claim 1, wherein the multiple viewpoint images are imaged by pupil division, with an imaging element having an imaging surface on which multiple photoelectric conversion elements are arranged,
the storage device stores the parallax correction information for each of different positions on the imaging surface of the imaging element, and
the second parallax amount calculation device acquires the parallax correction information for each of the positions on the imaging surface of the imaging element, from the storage device, and calculates the second parallax amount based on the acquired parallax correction information, the positions on the imaging surface of the imaging element corresponding to positions in the multiple viewpoint images.

5. The image processing device according to claim 1, wherein the storage device stores the parallax correction information for each of color channels of pixels of the viewpoint images, and
the second parallax amount calculation device acquires the parallax correction information for each of the color channels that is stored in the storage device, and calculates the second parallax amount for each of the color channels, based on the acquired parallax correction information.

6. The image processing device according to claim 1, wherein the multiple viewpoint images are configured by multiple colors of pixels that include a green pixel,
the storage device stores the parallax correction information corresponding to the green pixel, and
the second parallax amount calculation device acquires the parallax correction information corresponding to the green pixel, based on the parallax correction information corresponding to the green pixel that is stored in the storage device, and calculates the second parallax amount for the green pixel and pixels other than the green pixel of the multiple viewpoint images, based on the acquired parallax correction information.

7. The image processing device according to claim 1, wherein the multiple viewpoint images are imaged, using an image-taking optical system whose diaphragm value is variable,
the storage device stores the parallax correction information for each of diaphragm values of the image-taking optical system, and
the second parallax amount calculation device acquires the parallax correction information with the diaphragm value as a parameter when the multiple viewpoint images are imaged using the image-taking optical system, and calculates the second parallax amount based on the acquired parallax correction information.

8. The image processing device according to claim 1, comprising a parallax enhancement device configured to increasing the second parallax amount for the multiple viewpoint images calculated by the second parallax amount calculation device.

9. The image processing device according to claim 1, comprising a multi-viewpoint image generation device configured to generating multi-viewpoint images based on the second parallax amount calculated by the second parallax amount calculation device, the multi-viewpoint images being different in the number of viewpoints from the multiple viewpoint images acquired by the image acquisition device.

10. The image processing device according to claim 1, wherein the first parallax amount calculation device calculates an evaluation value in a unit of predetermined pixels or sub-pixels by performing a block matching between the viewpoint images, and, as the first parallax amount, sets a deviation amount between positions that minimize the evaluation value, the evaluation value indicating degree of coincidence.

11. The image processing device according to claim 10, wherein the first parallax amount calculation device calculates the evaluation value by determining a sum of squares of pixel value differences between the viewpoint images or a sum total of pixel value differences between the viewpoint images.

12. The image processing device according to claim 1, wherein the storage device stores the parallax correction information as a look-up table or a calculation formula.

13. An imaging device comprising:
the image processing device according to claim 1; and
an imaging device configured to performing imaging by a pupil-division scheme.

14. The imaging device according to claim 13, wherein the imaging device has an image-taking optical system that includes a focus lens, and
the imaging device comprises an autofocus processing device configured to performing a control to adjust a position of the focus lens of the image-taking optical system, based on the second parallax amount calculated by the second parallax amount calculation device.

15. An image processing method comprising:

a step for acquiring multiple viewpoint images generated by pupil-division imaging, the multiple viewpoint images being different in viewpoint;

a step for calculating a first parallax amount between viewpoint images for the multiple viewpoint images; and a step for calculating a second parallax amount based on the first parallax amount and parallax correction information stored in a storage device, the parallax correction information indicating a relationship between the first parallax amount and a deviation amount in a parallax direction for corresponding object images and being stored in the storage device in advance, the deviation amount being a deviation amount between viewpoint images for the multiple viewpoint images and being caused by the pupil-division imaging, the second parallax amount being an amount resulting from correcting the first parallax amount to the deviation amount in the parallax direction for the object images.

* * * * *